US010171865B2

(12) United States Patent
Minemura

(10) Patent No.: US 10,171,865 B2
(45) Date of Patent: Jan. 1, 2019

(54) ELECTRONIC DEVICE AND COMMUNICATION CONTROL METHOD

(71) Applicant: KABUSHIKI KAISHA TOSHIBA, Tokyo (JP)

(72) Inventor: Takashi Minemura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 11 days.

(21) Appl. No.: 15/009,635

(22) Filed: Jan. 28, 2016

(65) Prior Publication Data

US 2016/0150177 A1 May 26, 2016

Related U.S. Application Data

(63) Continuation of application No. PCT/JP2013/077958, filed on Oct. 15, 2013.

(51) Int. Cl.

| H04N 21/431 | (2011.01) |
| H04N 5/445 | (2011.01) |
| H04N 21/44 | (2011.01) |
| H04N 7/08 | (2006.01) |
| G06F 3/14 | (2006.01) |
| H04N 21/436 | (2011.01) |

(52) U.S. Cl.
CPC ..... *H04N 21/43615* (2013.01); *G06F 3/1454* (2013.01); *H04N 5/44504* (2013.01); *H04N 5/44513* (2013.01); *H04N 7/08* (2013.01); *H04N 21/431* (2013.01); *H04N 21/436* (2013.01); *H04N 21/4312* (2013.01); *H04N 21/44* (2013.01)

(58) Field of Classification Search
CPC ................. H04N 21/43615; G06F 3/1454
See application file for complete search history.

(56) References Cited

U.S. PATENT DOCUMENTS

| 6,981,045 B1 * | 12/2005 | Brooks | ............. H04L 29/06027 |
| | | | 348/E7.073 |
| 7,114,174 B1 * | 9/2006 | Brooks | ............. H04L 29/06027 |
| | | | 370/437 |
| 7,139,467 B2 * | 11/2006 | Seo | ...................... G11B 27/002 |
| | | | 348/E5.099 |

(Continued)

FOREIGN PATENT DOCUMENTS

| JP | 2005-269520 A | 9/2005 |
| JP | 2008-244993 A | 10/2008 |

(Continued)

*Primary Examiner* — William L Bashore
*Assistant Examiner* — Nathan K Shrewsbury
(74) *Attorney, Agent, or Firm* — Foley & Lardner LLP

(57) ABSTRACT

According to one embodiment, an electronic device includes a memory, a wireless transmitter, and one or more hardware processors. The wireless transmitter transmits content data to an external electronic device, the content data being encoded and including first data to display video and second data to display an object capable of being operated by a user. The one or more hardware processors are coupled to the memory, decode the second data, and execute, in accordance with a user operation on the object, processing corresponding to the user operation by using the decoded second data if the video and the object are displayed on a screen of the external electronic device by using the content data.

14 Claims, 21 Drawing Sheets

(56) References Cited

U.S. PATENT DOCUMENTS

| | | | | |
|---|---|---|---|---|
| 7,339,993 B1* | 3/2008 | Brooks | H04N 21/440263 | 375/240.1 |
| 7,636,132 B2* | 12/2009 | Sakamoto | H04L 29/06027 | 348/723 |
| 8,447,121 B2 | 5/2013 | Shen et al. | | |
| 2003/0185305 A1* | 10/2003 | MacInnis | G06F 9/3861 | 375/240.25 |
| 2004/0264929 A1* | 12/2004 | Lee | H04N 21/4104 | 386/240 |
| 2005/0213439 A1* | 9/2005 | Johnson | H04L 12/2805 | 369/30.18 |
| 2006/0013235 A1* | 1/2006 | Farnham | H04L 67/2823 | 370/401 |
| 2006/0263048 A1* | 11/2006 | Sato | H04N 5/775 | 386/247 |
| 2009/0044238 A1* | 2/2009 | Fukuda | G06Q 30/00 | 725/110 |
| 2009/0141180 A1 | 6/2009 | Kondo et al. | | |
| 2009/0153734 A1* | 6/2009 | Glen | G09G 5/006 | 348/552 |
| 2009/0240848 A1* | 9/2009 | Huetter | H04L 65/608 | 710/29 |
| 2009/0295988 A1* | 12/2009 | Kohno | H04N 21/234363 | 348/441 |
| 2009/0322948 A1* | 12/2009 | Funabiki | G06F 3/14 | 348/571 |
| 2010/0150475 A1* | 6/2010 | Holland | G06T 3/4007 | 382/300 |
| 2011/0093891 A1* | 4/2011 | Nakamura | H04N 21/4122 | 725/38 |
| 2011/0222516 A1* | 9/2011 | Kurose | H04M 1/7253 | 370/338 |
| 2011/0268185 A1 | 11/2011 | Watanabe et al. | | |
| 2011/0273276 A1* | 11/2011 | Minemura | H04W 52/0235 | 340/10.1 |
| 2012/0079544 A1* | 3/2012 | Massimino | H04N 21/4782 | 725/93 |
| 2012/0158984 A1* | 6/2012 | Maitre | H04N 21/643 | 709/231 |
| 2012/0311187 A1* | 12/2012 | Lv | H04N 21/43615 | 709/246 |
| 2013/0009887 A1* | 1/2013 | Huang | H04L 65/4092 | 345/173 |
| 2013/0027289 A1* | 1/2013 | Choi | G06F 3/14 | 345/156 |
| 2013/0060830 A1* | 3/2013 | Sato | H04L 67/125 | 709/201 |
| 2013/0135179 A1* | 5/2013 | Ko | G09G 5/00 | 345/2.2 |
| 2013/0223539 A1* | 8/2013 | Lee | H04L 65/607 | 375/240.25 |
| 2013/0314605 A1* | 11/2013 | Minemura | H04N 5/38 | 348/723 |
| 2014/0022341 A1* | 1/2014 | Minemura | H04N 13/0059 | 348/43 |
| 2014/0028779 A1* | 1/2014 | Minemura | H04N 7/147 | 348/14.02 |
| 2014/0201776 A1* | 7/2014 | Minemura | H04N 21/2541 | 725/25 |
| 2014/0287682 A1* | 9/2014 | Minemura | H04W 4/008 | 455/41.1 |
| 2014/0289787 A1* | 9/2014 | Minemura | H04N 21/4126 | 725/116 |
| 2014/0330951 A1* | 11/2014 | Sukoff | H04L 47/70 | 709/223 |
| 2014/0351844 A1* | 11/2014 | Minemura | H04N 21/42224 | 725/25 |
| 2015/0104144 A1* | 4/2015 | Minemura | H04L 65/1069 | 386/230 |

FOREIGN PATENT DOCUMENTS

| | | |
|---|---|---|
| JP | 2008-252752 A | 10/2008 |
| JP | 2009-508445 A | 2/2009 |
| JP | 2009/135726 A | 6/2009 |
| JP | 2013-143242 A | 7/2013 |
| JP | 2013-187589 A | 9/2013 |
| WO | WO-2007/033242 A1 | 3/2007 |
| WO | WO-2010/079790 A1 | 7/2010 |

* cited by examiner

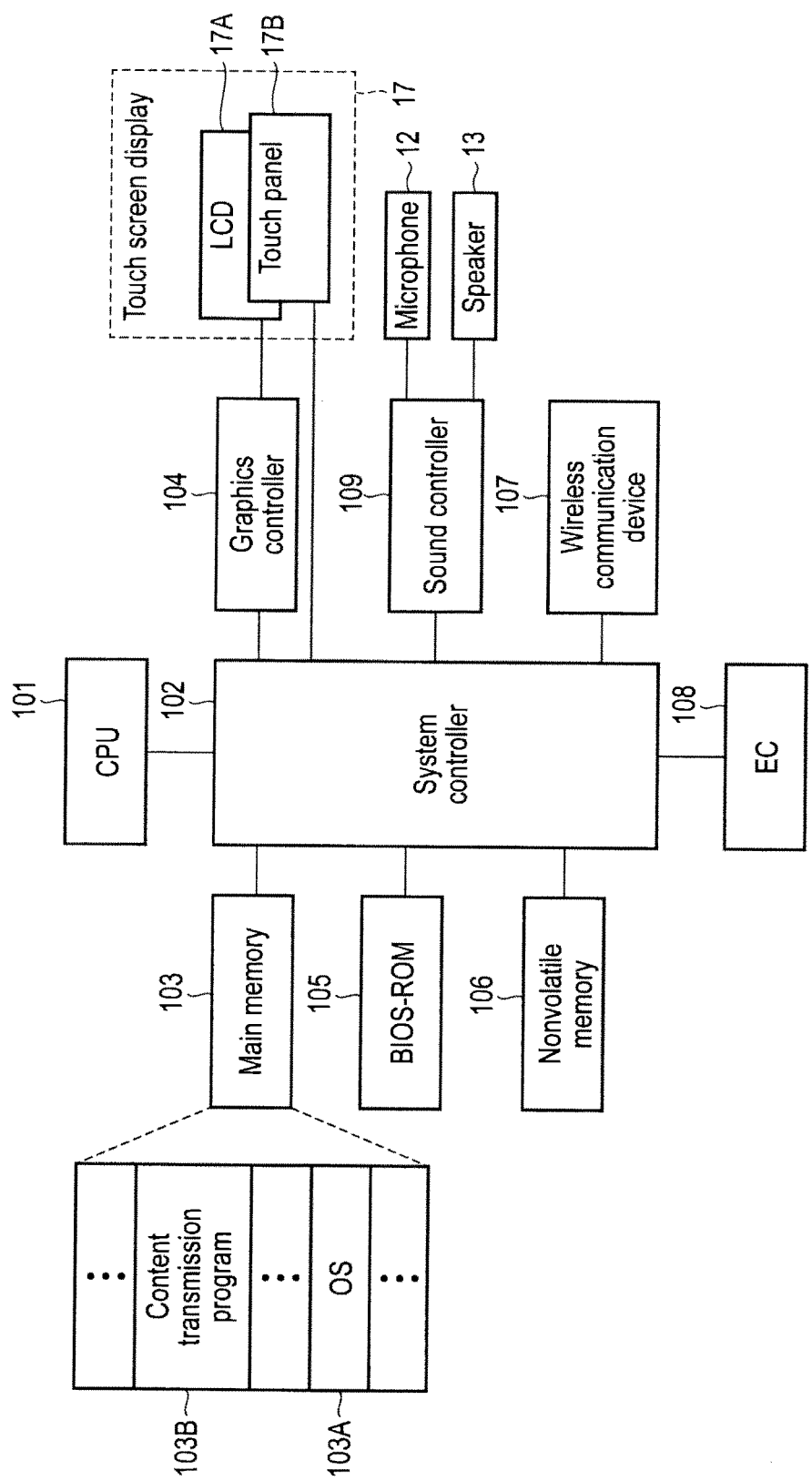
F I G. 2

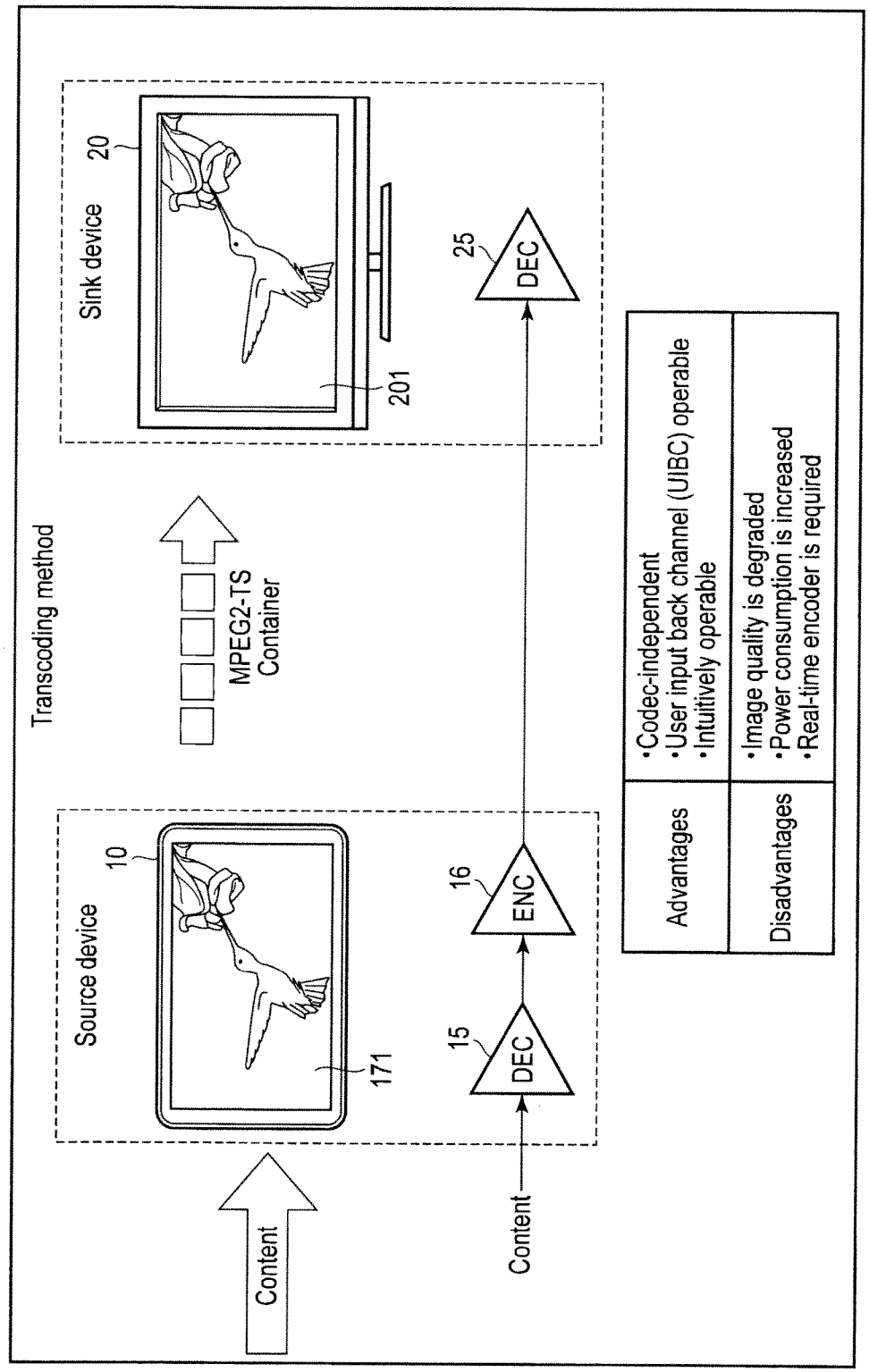
F I G. 3

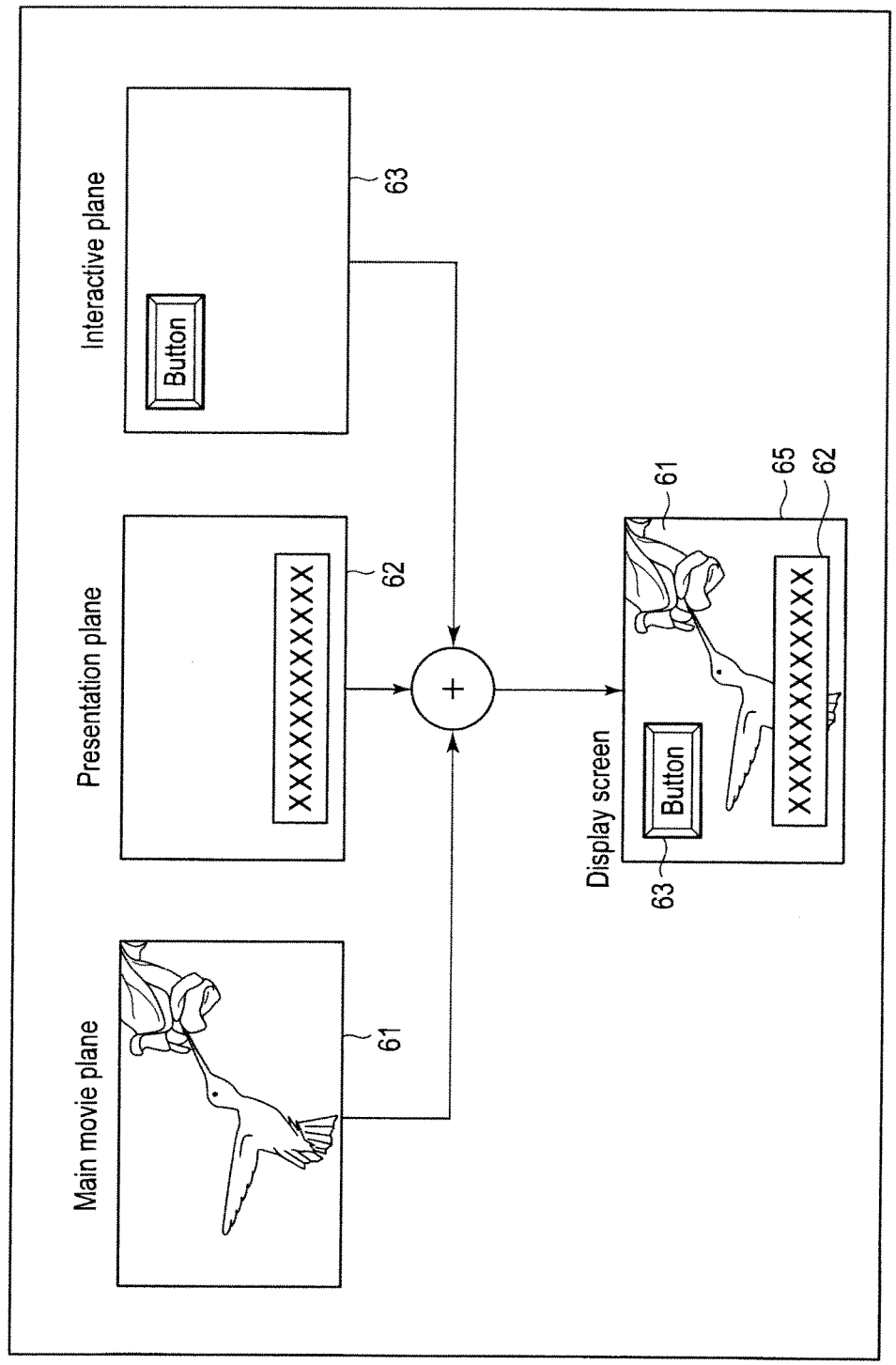
F I G. 5

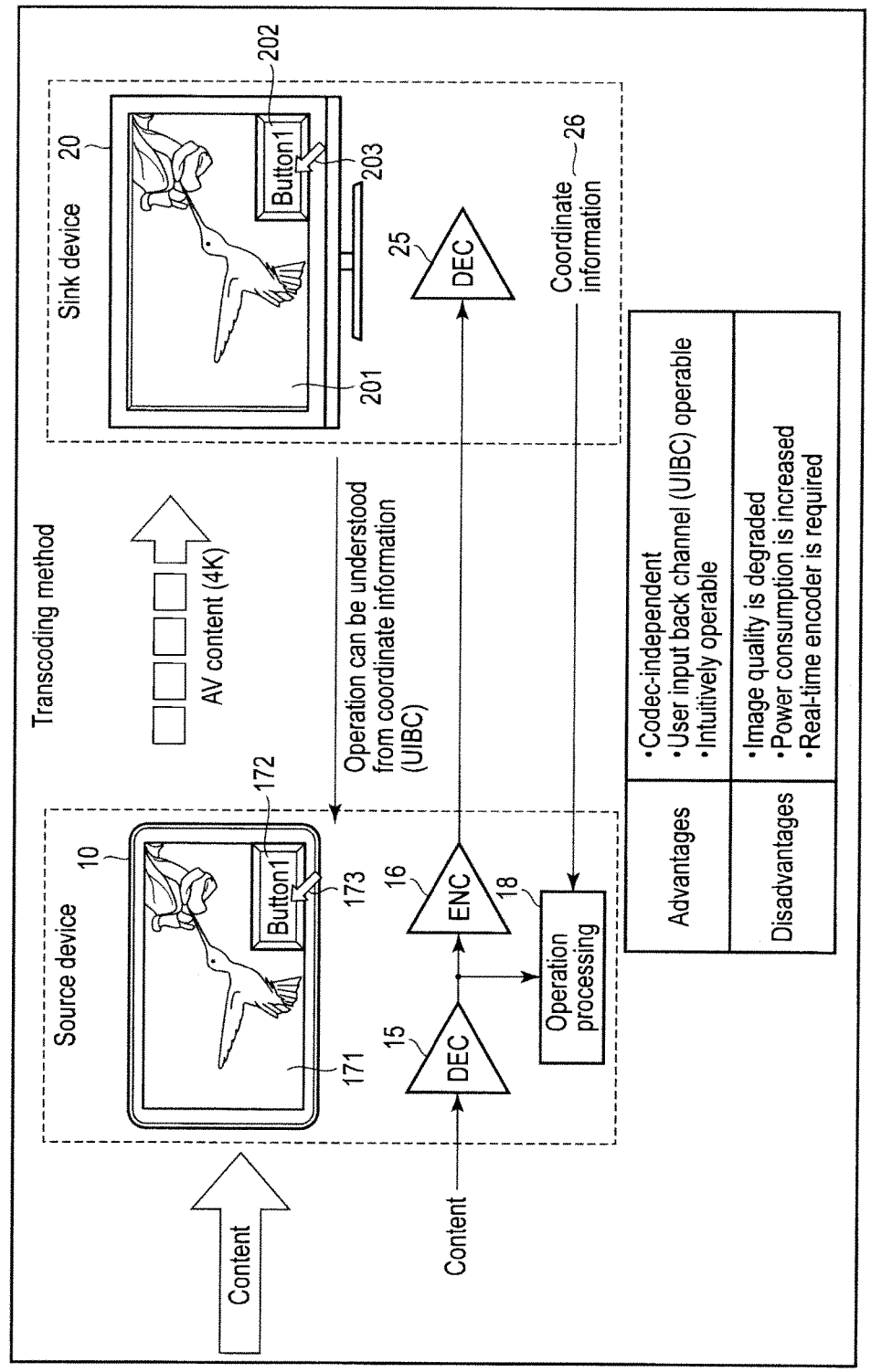
F I G. 6

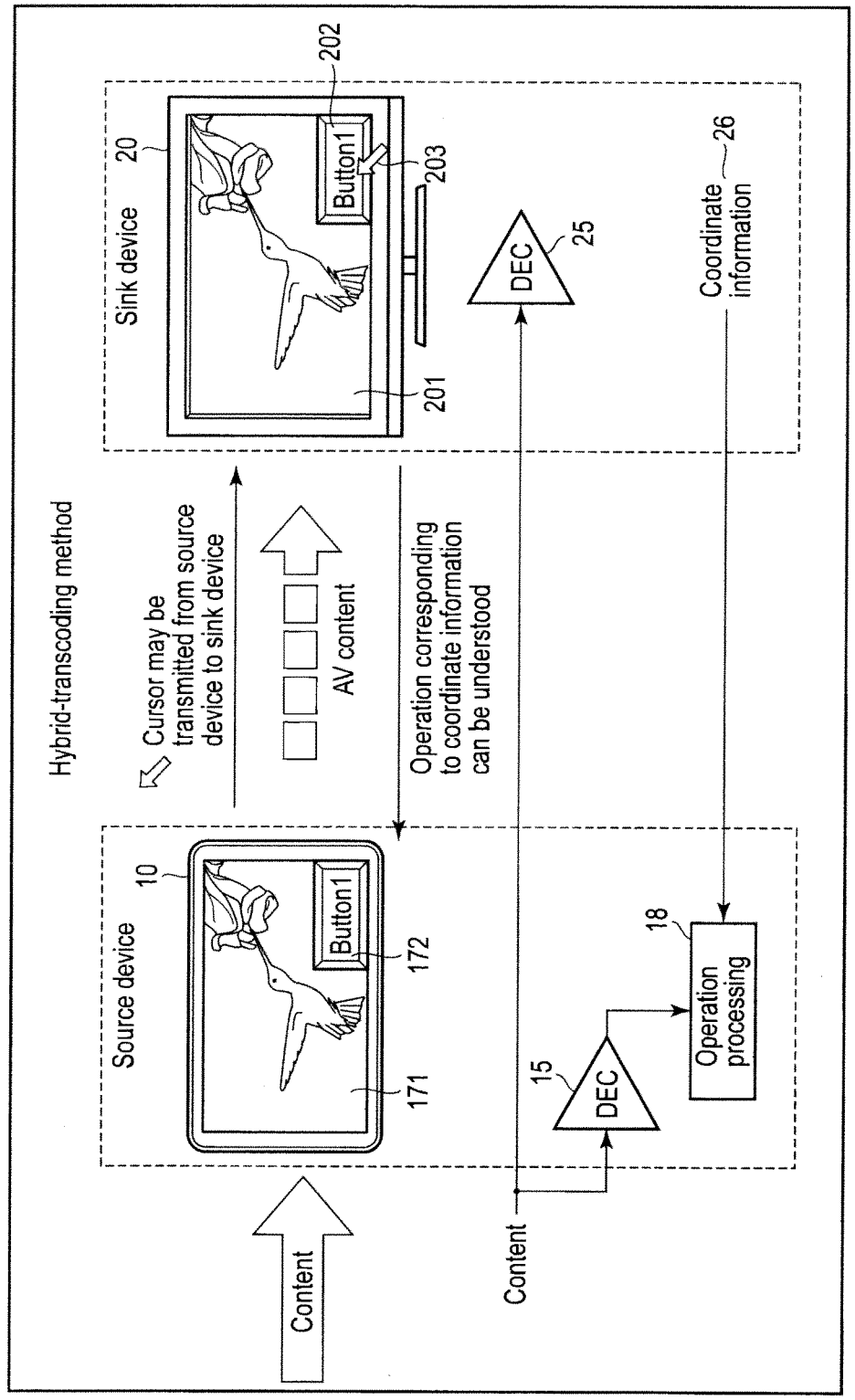
F I G. 9

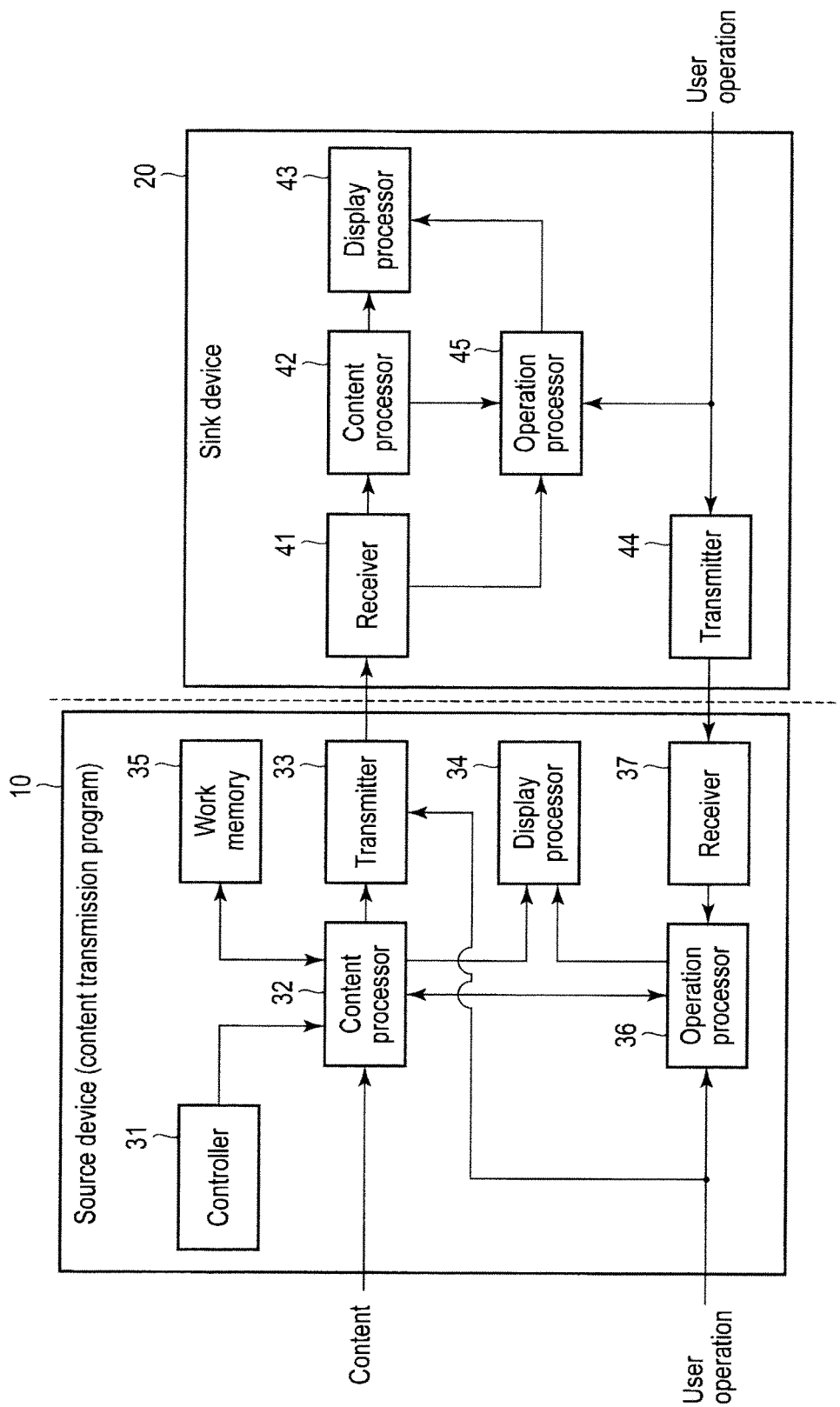
F I G. 11

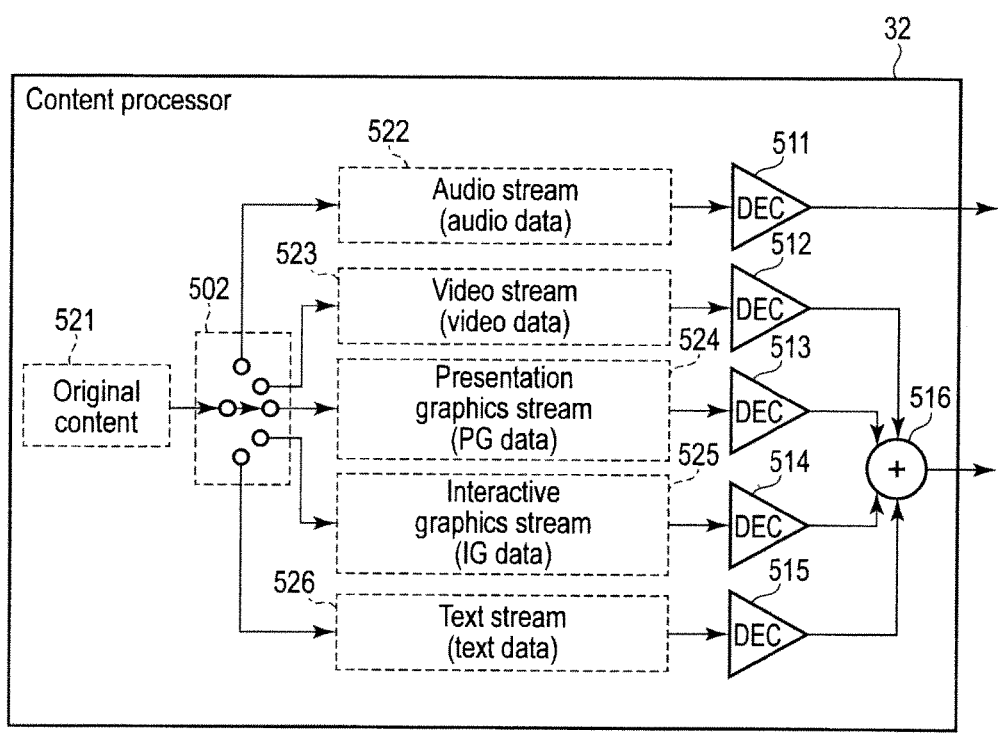
F I G. 12

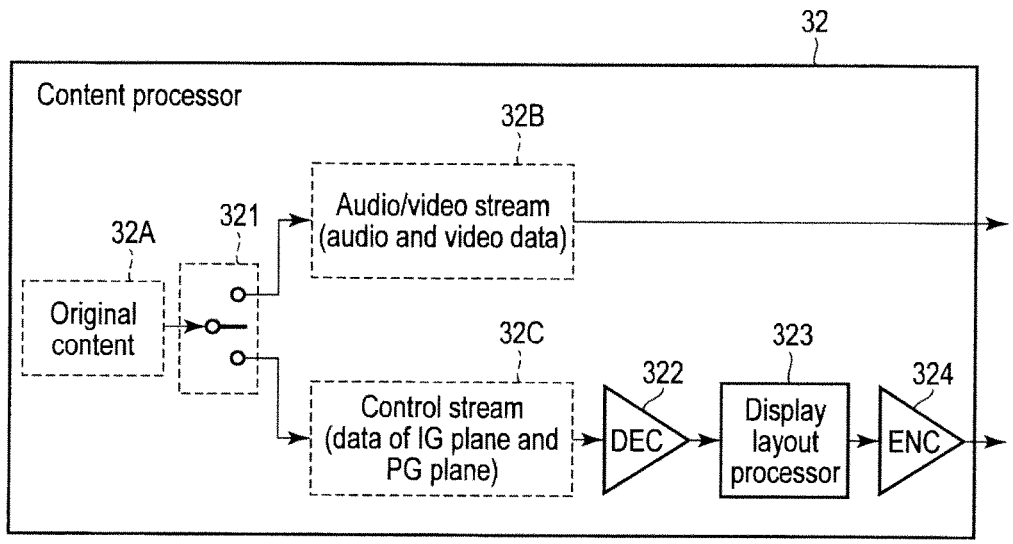
F I G. 15
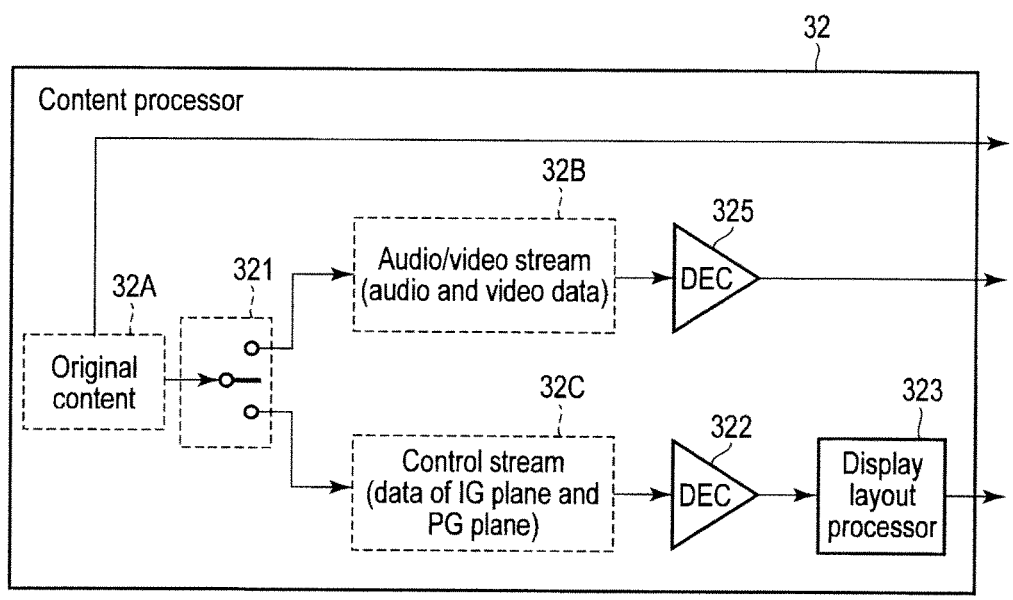
F I G. 16

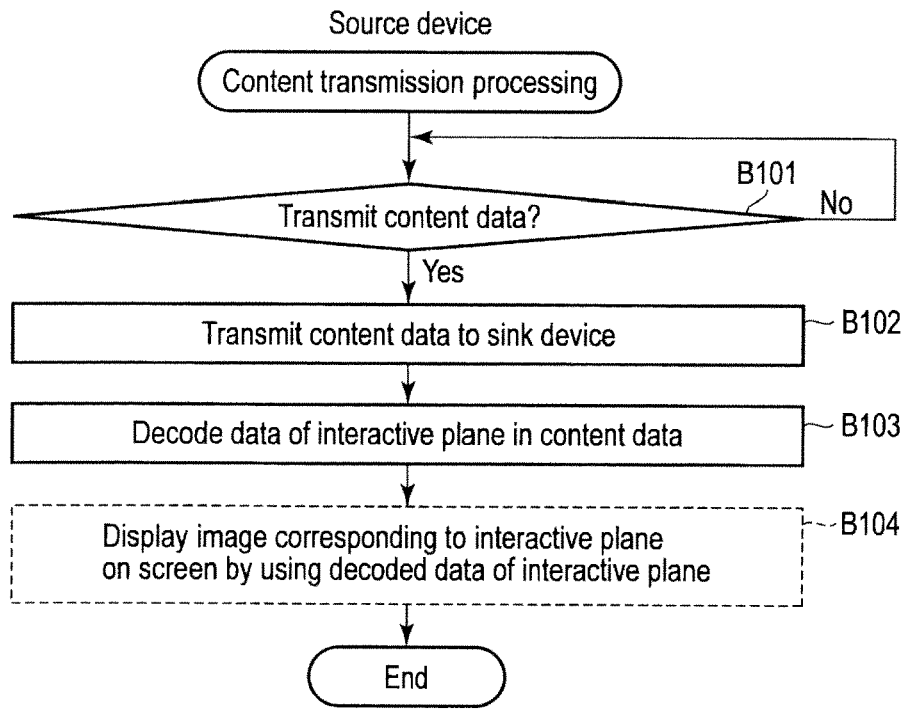
F I G. 17
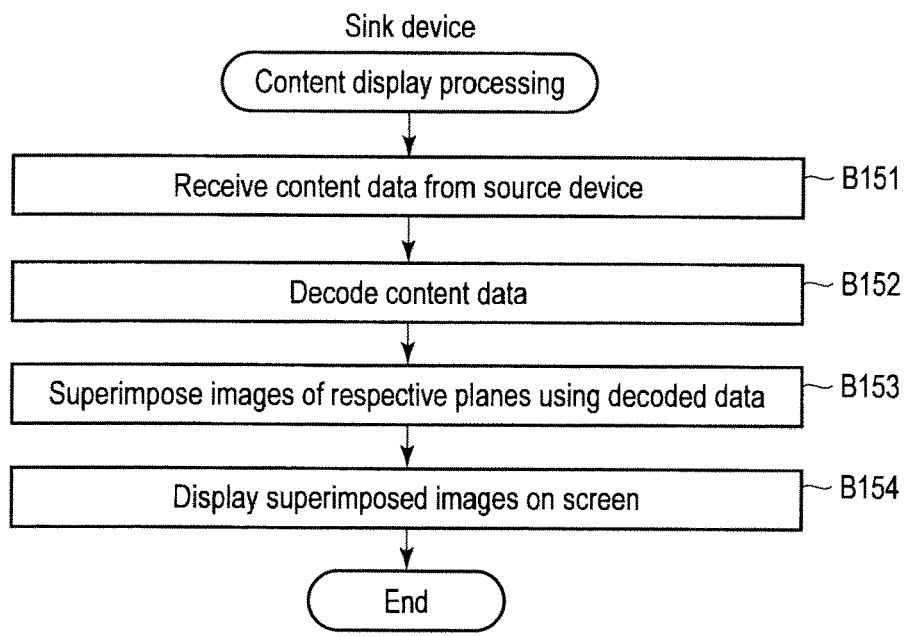
F I G. 18

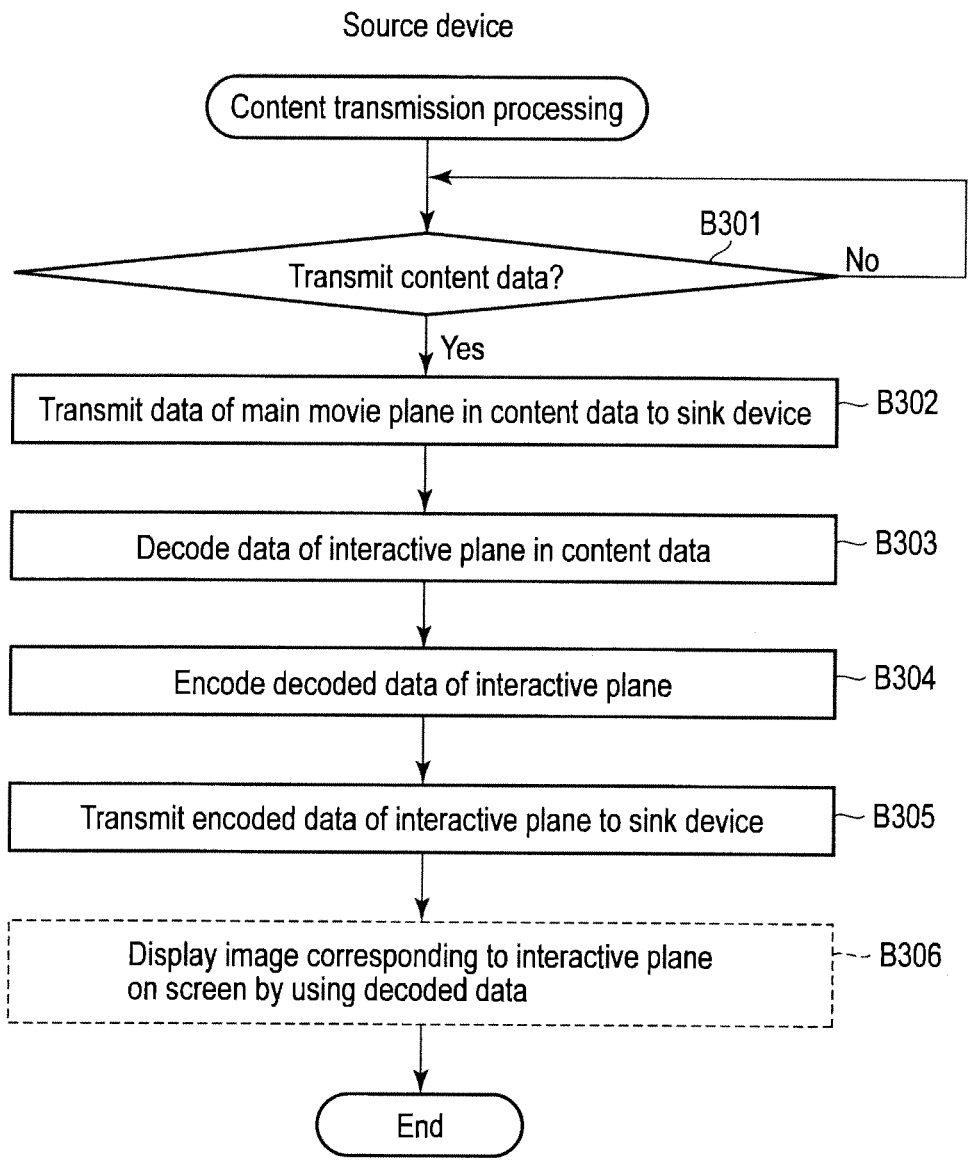
F I G. 21

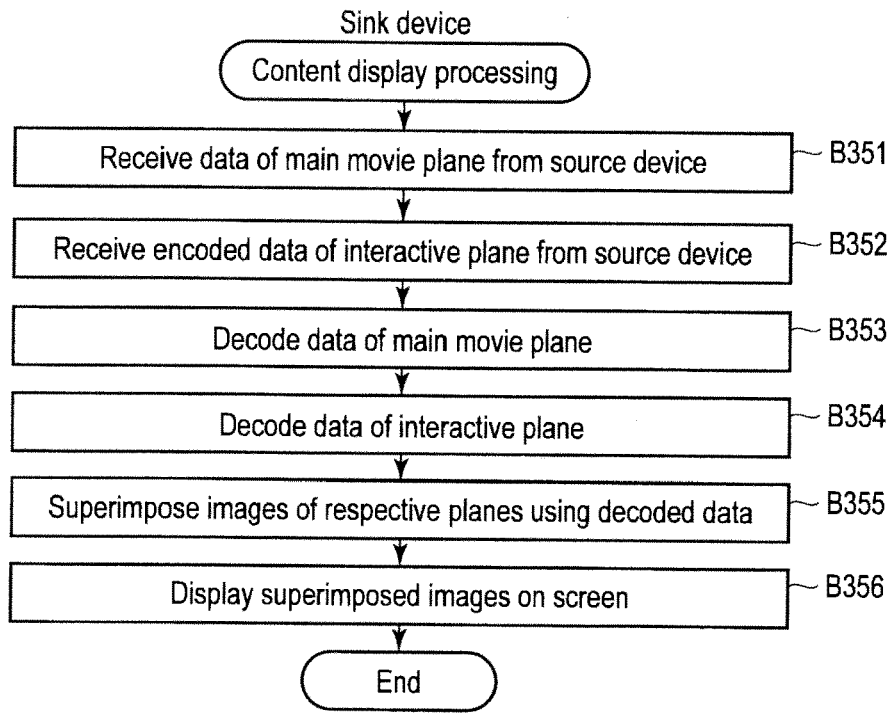
F I G. 22
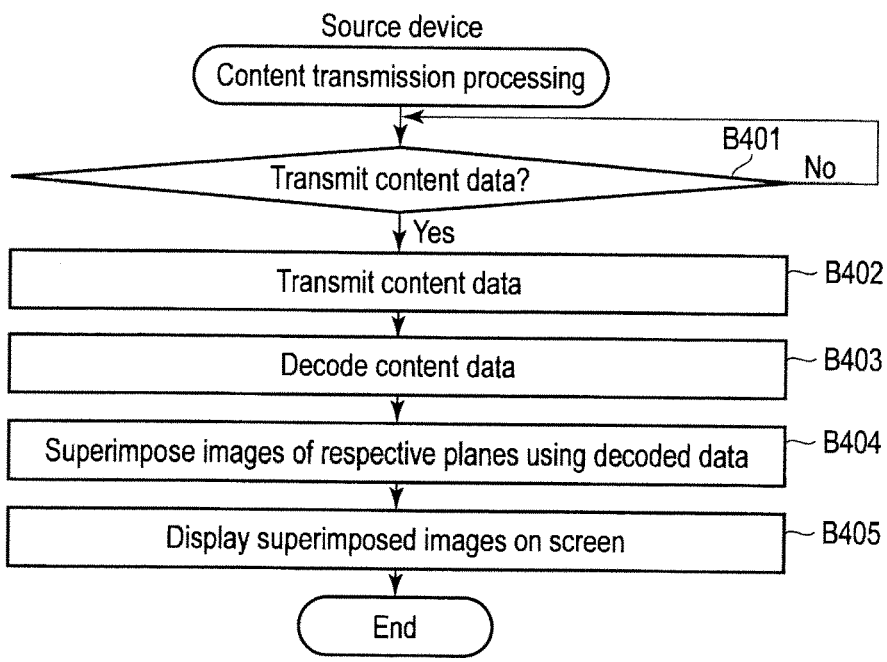
F I G. 23

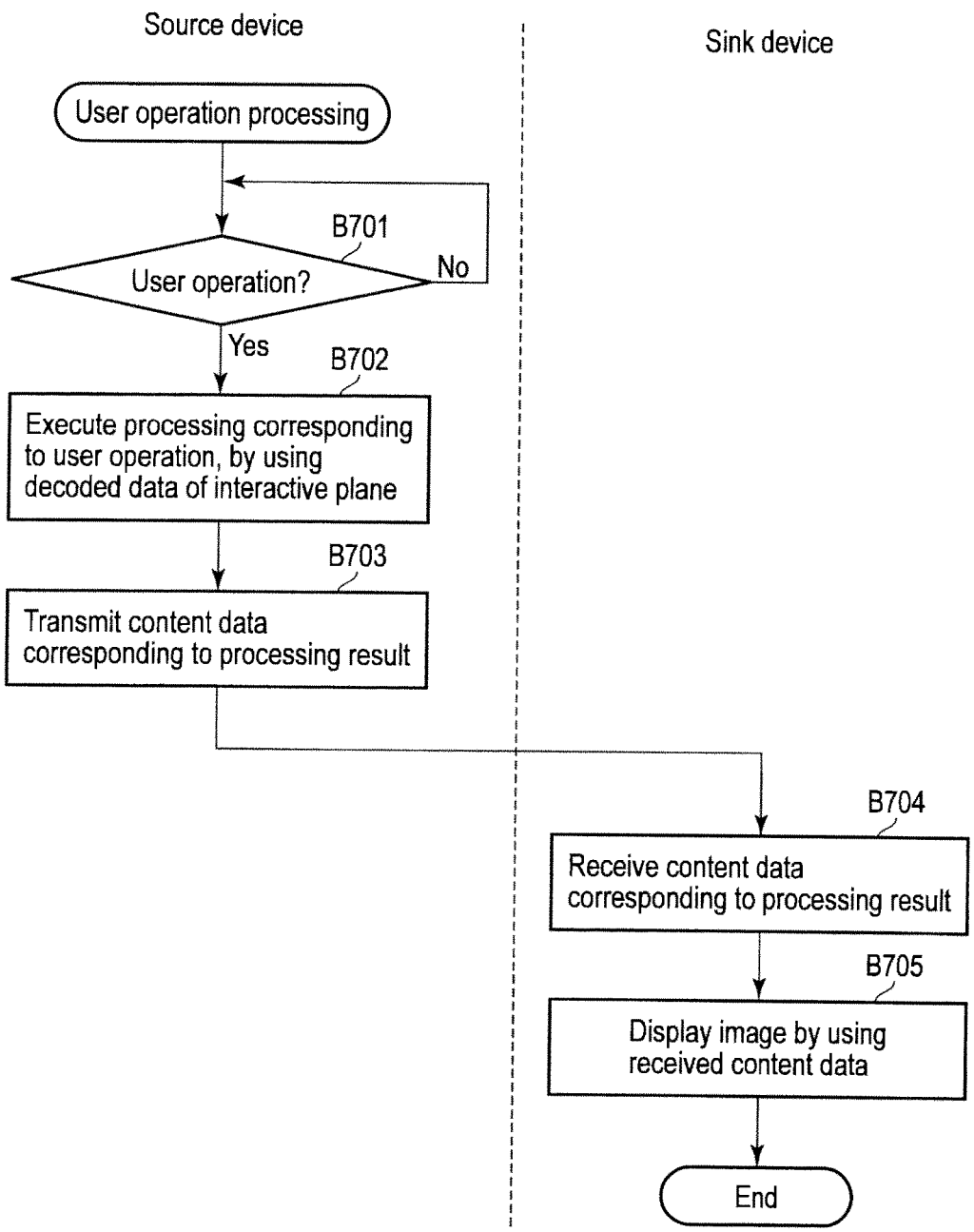
F I G. 25

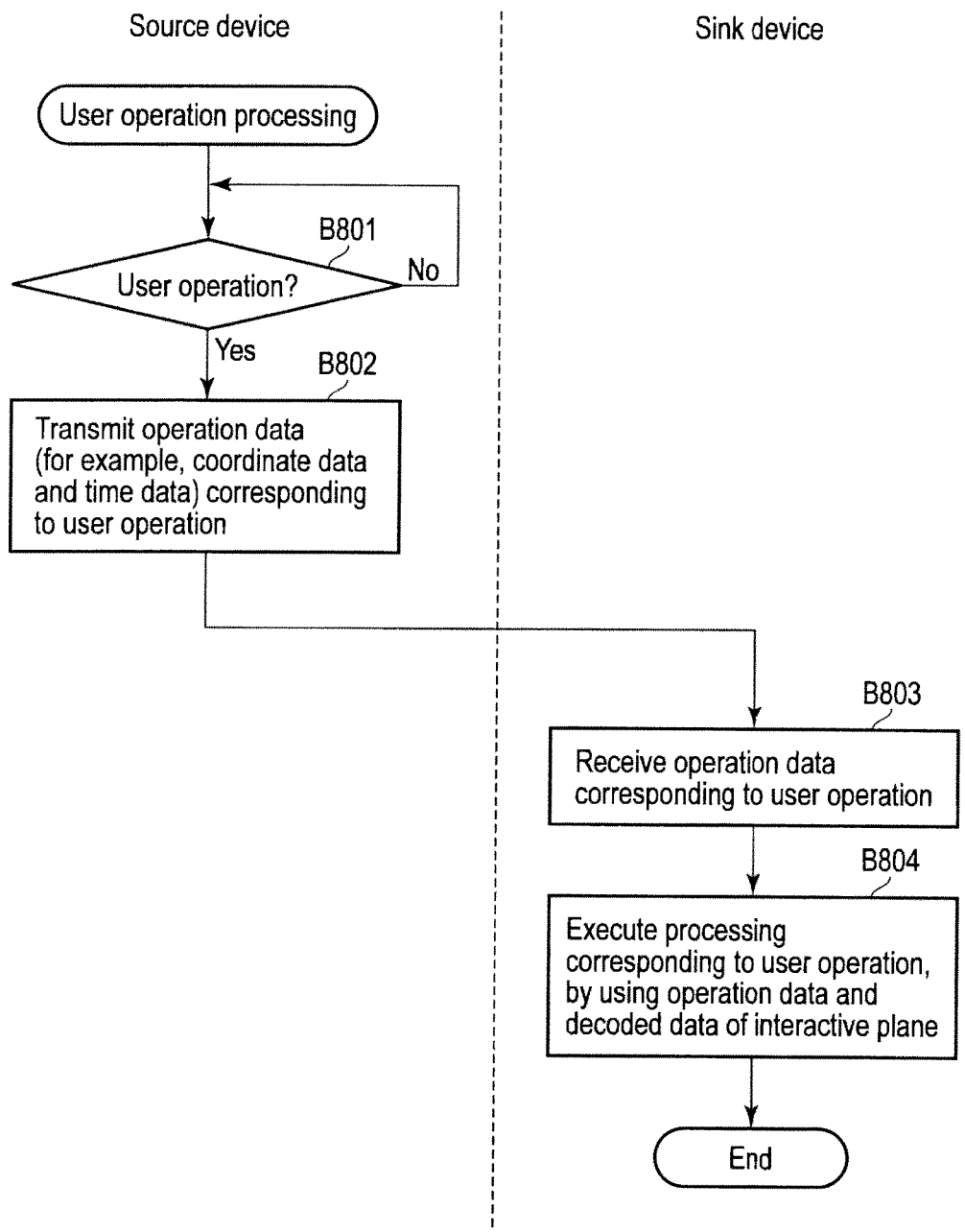
F I G. 26

ELECTRONIC DEVICE AND COMMUNICATION CONTROL METHOD

CROSS REFERENCE TO RELATED APPLICATIONS

This application is a Continuation Application of PCT Application No. PCT/JP2013/077958, filed Oct. 15, 2013, the entire contents of which are incorporated herein by reference.

FIELD

Embodiments described herein relate generally to an electronic device transmitting content data, and a communication control method applied to the electronic device.

BACKGROUND

Wi-Fi Direct, which wirelessly connects two devices via no access point, has been used. As a technique using the Wi-Fi Direct, a technique which provides seamless display of a content between wirelessly connected devices (Wi-Fi Display) is known. When viewing of a content on a source device is requested, the content can be displayed on a screen of a sink device, and the user can view, for example, video displayed on a small screen such as a screen of a smartphone or a tablet computer (source device), on a larger screen such as a screen of a television receiver (sink device). In this method, since the content is displayed on the screen of the source device, the encoded original content is once decoded, and displayed on the screen. Then, the decoded content is re-encoded and the re-encoded content is transmitted to the sink device.

However, if the content is re-encoded as explained above, the image quality may be degraded. If the source device transmits a content as it is to the sink device without decoding and the sink device decodes the whole content, the original quality of the content can be maintained since decoding and re-encoding of the content is not performed in the source device.

In the meantime, the content may include not only video and audio, but also objects such as a menu and a button, which can be operated by a user. However, the method of transmitting content to the sink device without decoding has an issue that when an object is displayed on the screen of the sink device, a user operation for the object often cannot be processed appropriately.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing an example of a system configuration of the electronic device of the embodiment.

FIG. 3 is a view for explanation of content transmission in a transcoding method.

FIG. 5 is a diagram showing an example of configuration of a content transmitted by the electronic device of the embodiment.

FIG. 6 is a view for explanation of an example in which a user operation is processed when a content is transmitted by the transcoding method of FIG. 3.

FIG. 9 is a view for explanation of another example in which a content is transmitted by a hybrid-transcoding method by the electronic device of the embodiment.

FIG. 11 is a block diagram showing a functional configuration of a content transmission program executed by the electronic device of the embodiment.

FIG. 12 is a block diagram showing a first example of a configuration of a content processor in the content transmission program of FIG. 11.

FIG. 15 is a block diagram showing a fourth example of a functional configuration of the content processor in the content transmission program of FIG. 11.

FIG. 16 is a block diagram showing a fifth example of a configuration of the content processor in the content transmission program of FIG. 11.

FIG. 17 is a flowchart showing a first example of the procedure of content transmission processing executed by the electronic device (source device) of the embodiment.

FIG. 18 is a flowchart showing a first example of the procedure of content display processing executed by an external electronic device (sink device) receiving a content from the electronic device of the embodiment.

FIG. 21 is a flowchart showing a third example of the procedure of the content transmission processing executed by the electronic device (source device) of the embodiment.

FIG. 22 is a flowchart showing a third example of the procedure of the content display processing executed by an external electronic device (sink device) receiving a content from the electronic device of the embodiment.

FIG. 23 is a flowchart showing a fourth example of the procedure of the content transmission processing executed by the electronic device (source device) of the embodiment.

FIG. 25 is a flowchart showing a second example of the procedure of the user operation processing executed by the electronic device (source device) of the embodiment and the external electronic device (sink device).

FIG. 26 is a flowchart showing a third example of the procedure of the user operation processing executed by the electronic device (source device) of the embodiment and the external electronic device (sink device).

DETAILED DESCRIPTION

Various embodiments will be described hereinafter with reference to the accompanying drawings.

In general, according to one embodiment, an electronic device includes a memory, a wireless transmitter and one or more hardware processors. The wireless transmitter is configured to transmit content data to an external electronic device, the content data being encoded and including first data to display video and second data to display an object capable of being operated by a user. The one or more hardware processors are coupled to the memory. The one or more hardware processors are configured to decode the second data and to execute, in accordance with a user operation on the object, processing corresponding to the user operation by using the decoded second data if the video and the object are displayed on a screen of the external electronic device by using the content data.

Figure 1:
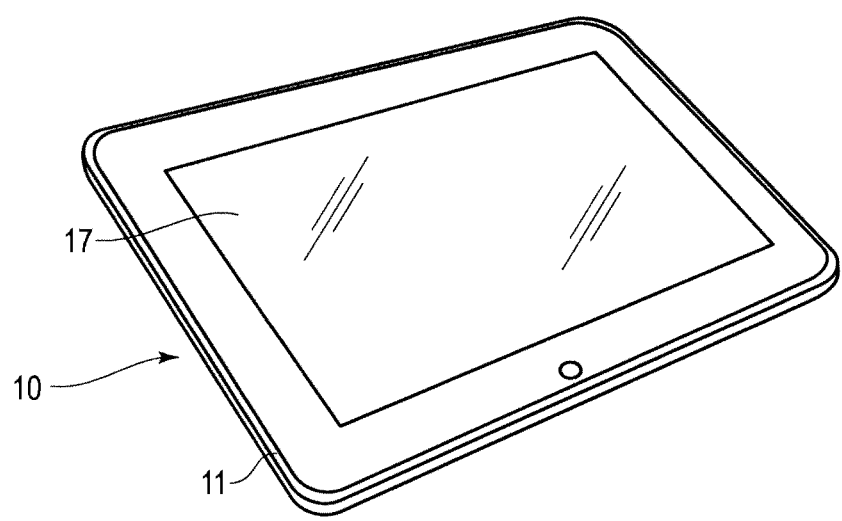
FIG. 1 is a perspective view showing an example of an appearance of an electronic device according to an embodiment.

FIG. 1 is a perspective view showing an appearance of an electronic device according to an embodiment. The electronic device can be realized as a tablet computer, a notebook-type personal computer, a smartphone, a PDA, and an integrated system built in various types of electronic devices such as a digital camera. It is hereinafter assumed that the electronic device is realized as a tablet computer 10. The tablet computer 10 is a portable electronic device called a tablet or a slate computer, and includes a body 11 and a touchscreen display 17 as shown in FIG. 1. The touchscreen display 17 is mounted on the body 11 so as to be laid on an upper surface of the body 11.

The body 11 includes a housing shaped in a thin box. In the touchscreen display 17, a flat panel display and a sensor configured to detect a contact position of a stylus or a finger on the screen of the flat panel display are incorporated. The flat panel display may be, for example, a liquid crystal display (LCD). As the sensor, for example, a capacitive touch panel, an electromagnetic-induction-type digitizer or the like may be used.

FIG. 2 is a diagram showing a system configuration of the tablet computer 10.

As shown in FIG. 2, the tablet computer 10 includes a CPU 101, a system controller 102, a main memory 103, a graphics controller 104, a BIOS-ROM 105, a nonvolatile memory 106, a wireless communication device 107, an embedded controller (EC) 108, a sound controller 109 and the like.

The CPU 101 is a processor which controls operations of various components in the tablet computer 10. The CPU 101 executes various types of software loaded from the nonvolatile memory 106 serving as a storage device, to the main memory 103. The software includes an operating system (OS) 103A and various application programs. The application programs include a content transmission program 103B. The content transmission program 103B has a content data transmission/display function of seamlessly displaying a content on a screen of an external electronic device (sink device), with the tablet computer 10 used as a source device.

In addition, the CPU 101 executes a basic input/output system (BIOS) stored in the BIOS-ROM 105. The BIOS is a program for hardware control.

The system controller 102 is a device which makes connection between s a local bus of the CPU 101 and various components. The system controller 102 incorporates a memory controller which controls access to the main memory 103. In addition, the system controller 102 also has a function of communicating with the graphics controller 104 via a serial bus conforming to the PCI EXPRESS standard.

The graphics controller 104 is a display controller which controls an LCD 17A used as a display monitor of the tablet computer 10. A display signal generated by the graphics controller 104 is sent to the LCD 17A. The LCD 17A displays a screen image, based on the display signal. A touch panel 17B is disposed on the LCD 17A.

The system controller 102 also has a function of communicating with the sound controller 109. The sound controller 109 is a sound source device and outputs audio data, which is a target of playback, to a speaker 13 or the like. In addition, the sound controller 109 outputs data of the audio detected by a microphone 12, to the system controller 102.

The wireless communication device 107 is a device configured to execute communications based on, for example, IEEE 802.11n and Wi-Fi Direct. The wireless communication device 107 can establish a wireless connection between devices without any access points. It should be noted that the wireless communication device 107 may be a device configured to execute wireless communication such as wireless LAN or 3G mobile communication or may be a device configured to execute wired communication such as wired LAN.

The EC 108 is a single-chip microcomputer including an embedded controller for power management. The EC 108 includes a function of powering on or powering off the tablet computer 10 in accordance with a user operation of a power button.

As explained above, the tablet computer 10 has the function of seamlessly displaying a content on a connected external electronic device. This function is realized by using, for example, a technique (Wi-Fi Display) for providing seamless content display between wirelessly connected devices by using Wi-Fi Direct which wirelessly connects two devices without any access points. When viewing a content on the tablet computer 10 (hereinafter also referred to as a source device) is requested, the content (video, image, and audio) can be output to a display or a speaker of an external electronic device (hereinafter also referred to as a sink device), by this function, and the user can view, for example, video displayed on a small screen such as a screen of the tablet computer 10, on a larger screen such as a screen of a television receiver.

For example, a transcoding method is used for the content transmission between the devices but, if the sink device can decode the codec of an original content, transmission in a non-transcoding method may also be employed.

As shown in FIG. 3, the source device 10 transcodes content data to a codec (for example, H.264 in the case of video data) which can be decoded by the sink device 20, and transmits the transcoded content data to the sink device 20, in the transmission of the transcoding method. That is, a decoder 15 of the source device 10 decodes the content data, and an encoder 16 re-encodes the decoded content data and transmits the re-encoded content data to the sink device 20. The encoder 16 may capture an image of the content displayed on the screen and encode (re-encode) the captured image. In addition, the source device 10 displays a content (video) 171 on the screen of the source device 10 by using the decoded content data.

On the other hand, the sink device 20 receives the transcoded content data from the source device 10 with, for example, an MPEG2-TS container, decodes the content data by a decoder 25, and displays content (video) 201 on the screen of the sink device 20.

Thus, since the transcoded content data is transmitted to the sink device 20 in the transmission of the transcoding method, the content 201 can be displayed on the screen of the sink device 20 regardless of the codec (codec scheme) of the original content data. In the transmission of the transcoding method, however, the image quality may be degraded by transcoding (re-encoding). Further, to transmit the content from the source device 10 to the sink device 20 with very little delay, the encoder 16 in the source device 10 needs to be a real-time encoder capable of encoding the content data in real time, and the power consumption for the encoding increases accordingly.

Figure 4:
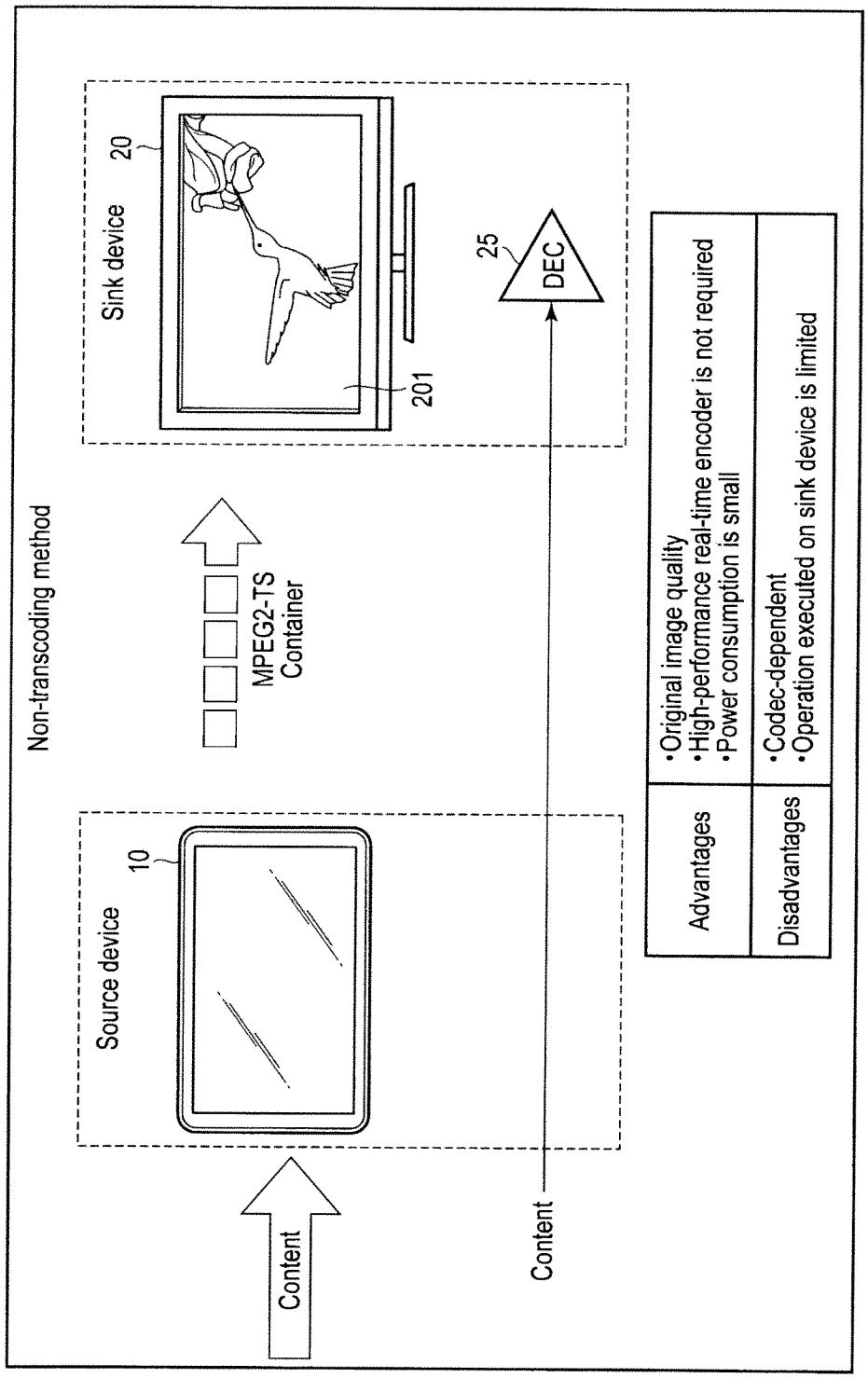
FIG. 4 is a view for explanation of content transmission in a non-transcoding method.

On the other hand, as shown in FIG. 4, the source device 10 transmits the original content data just as it is to the sink device 20, in the transmission of the non-transcoding method. In the sink device 20, the decoder 25 decodes the original content data and displays the content (video) 201 on the screen of the sink device 20. Since the content data has not been transcoded (i.e., neither decoded nor encoded) in the source device 10, no content is displayed on the screen of the source device 10.

Thus, the video can be displayed with the original image quality on the screen of the sink device 20, in the transmission of the non-transcoding method. In addition, since the content data is neither decoded nor encoded by the source device 10, the power consumption can be decreased and a high-performance real-time encoder (i.e., an encoder capable of processing a large-size image in real time) is not required. In the transmission of the non-transcoding method, however, the sink device 20 needs to be capable of decoding the original content data, that is, adaptive to the codec (codec scheme) of the original content data.

In addition, in some cases, the content data includes not only video and audio data, but also data of an object such as a menu or a button which can be operated by the user (i.e., an interactive object).

FIG. 5 shows an example of a content including image planes (layers) 61, 62 and 63. A main movie plane 61 corresponds to video and sound in the content. Data corresponding to the main movie plane 61 has the largest data size in the content data and, for example, as the image size (angle of view) becomes larger, the resource necessary for encoding increases. The data corresponding to the main movie plane 61 is also called an audio/video stream.

The presentation plane 62 corresponds to information such as subtitles. The data size of data corresponding to the presentation plane 62 is generally very small. In addition, an interactive plane 63 corresponds to an object which is a target of a user operation, and is arranged on the screen, for example, as a button. Data corresponding to the presentation plane 62, the interactive plane 63 and the like other than the main movie plane 61 is also called a control stream.

These image planes 61, 62 and 63 are superimposed and displayed as a single image 65 on the screen. Since, for example, the video, the subtitles, the button and the like can be independently controlled by using these image planes 61, 62 and 63, compatibility can be given to the content, and the implementation for using the content can be facilitated.

The transmission in the transcoding method and the transmission in the non-transcoding method in a case where the content includes an object (interactive plane) which is an operation target such as a button will be explained with reference to FIGS. 6 and 7. This content is an AV content of high-quality video or what is called 4K, having the number of pixels which is four times greater than the number of pixels of high-definition video.

In the example illustrated in FIG. 6, content data which has been transcoded by the decoder 15 and the encoder 16 of the source device 10 is transmitted to the sink device 20, in the transmission of the transcoding method, as explained above with reference to FIG. 3. On the screen of the source device 10, video (main movie plane) 171 and a button (interactive Plane) 172 included in the content are displayed. A cursor 173 is an arrow image indicative of a position of a user operation designated by using a pointing device or the like.

In the sink device 20, the content data (i.e., the transcoded content data) received from the source device 10 is decoded by the decoder 25, and video (main movie plane) 201 and a button (interactive plane) 202 included in the content are displayed on the screen of the sink device 20. Incidentally, a cursor 203 corresponding to the cursor 173 on the screen of the source device 10 may be displayed on the screen of the sink device 20, based on data relating to the cursor 173 which has been transmitted from the source device 10.

If a user operation for content (for example, an operation of pressing the button 202) is executed on the sink device 20 while the content is displayed on the screen of the sink device 20, the sink device 20 transmits coordinate information 26 corresponding to the user operation to the source device 10 by using a user input back channel (UIBC) function. The UIBC is a communication channel established between devices in order to transmit and receive data relating to an input by the user.

The source device 10 receives the coordinate information 26 corresponding to the user operation from the sink device 20, over the UIBC. Then, the source device 10 can recognize the user operation corresponding to the coordinate information 26 by using the content data decoded by the decoder 15, execute the operation processing 18 corresponding to the user operation, and reflect the processing result on the screen of the sink device 20. In other words, the same content (image) based on the user operation can be displayed on the screen of the source device 10 and the screen of the sink device 20.

In addition, when a user operation for the content (for example, an operation of pressing a button 172) is executed on the source device 10, the source device 10 can execute the operation processing 18 corresponding to the user operation by using the content data decoded by the decoder 15, and reflect the processing result on the screen of the sink device 20.

Thus, since the source device 10 decodes the content data, the source device 10 can execute, with very little delay, the processing corresponding to the user operation in the source device 10 or the sink device 20. For this reason, the user can execute an intuitive operation on the displayed content which is transmitted from the source device 10 to the sink device 20.

As explained above, however, the transmission of the transcoding method has disadvantages that the image quality may be deteriorated due to transcoding, a real-time encoder is required and the power consumption increases accordingly.

Figure 7:
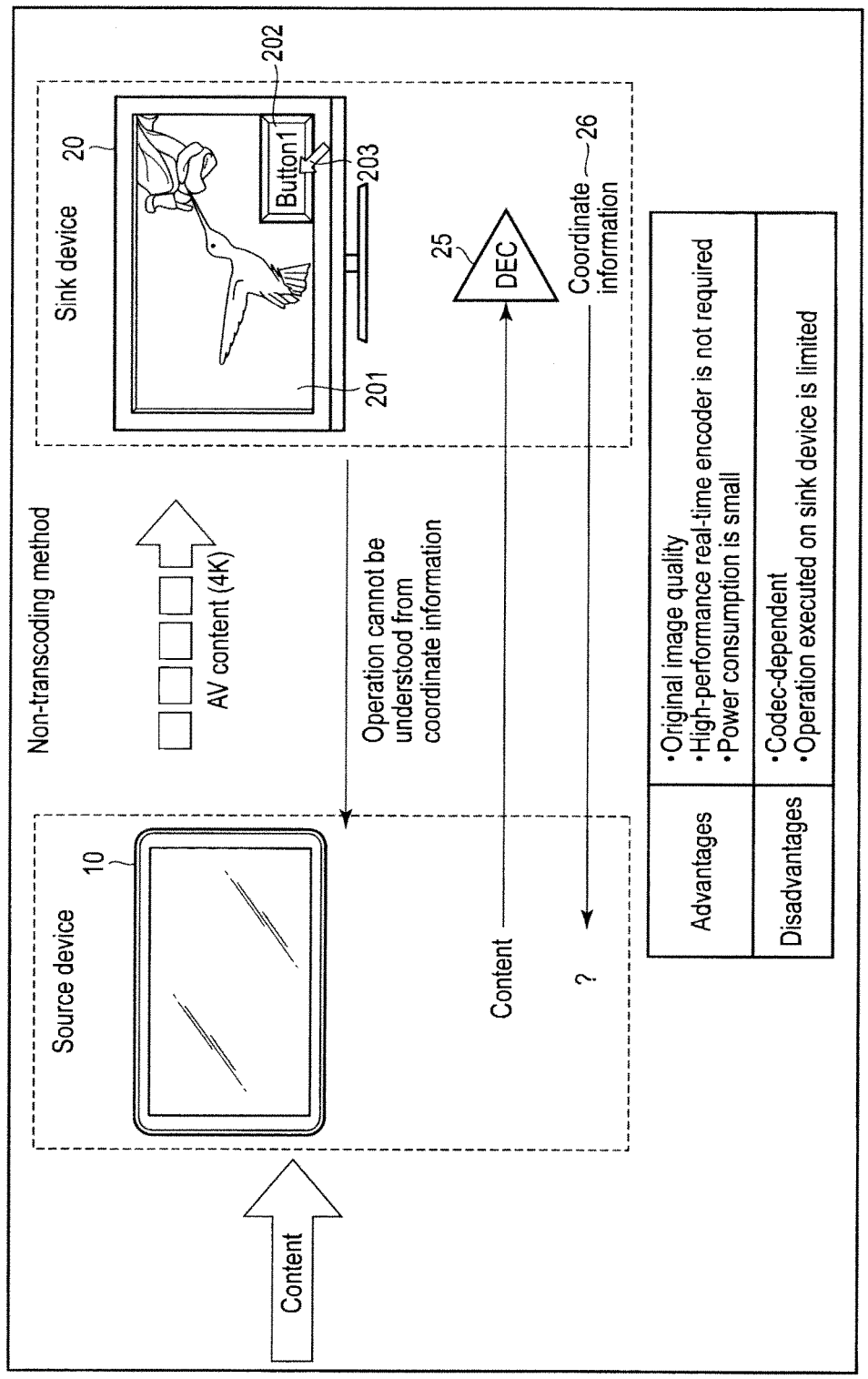
FIG. 7 is a view for explanation of an example in which a user operation cannot be processed when a content is transmitted by the non-transcoding method of FIG. 4.

In the example illustrated in FIG. 7, the original content data is transmitted from the source device 10 to the sink device 20, in the transmission of the non-transcoding method, as explained above with reference to FIG. 4. In the sink device 20, the received original content data is decoded by the decoder 25, and the video (main movie plane) 201 and button (interactive plane) 202 included in the content are displayed on the screen of the sink device 20. Incidentally, a cursor 203 is an arrow image indicative of a position of a user operation.

If a user operation on the content is executed on the sink device 20 in a case where the content is displayed on the screen of the sink device 20, the sink device 20 transmits coordinate information 26 corresponding to the user operation to the source device 10. The source device 10 receives the coordinate information 26 corresponding to the user operation from the sink device 20. However, since the source device 10 does not decode the content data, the source device 10 is unable to recognize the user operation corresponding to the coordinate information 26 and cannot execute processing corresponding to the user operation.

The user operation on the content is executed by using, for example, an operation panel including buttons. User operations using the operation panel may include not only operations which are common to various content such as operations for controlling playback of the content (for example, playback, stop, pause, resume, fast forward, fast rewind, slow playback, and the like), but also operations depending on the content such as an operation for a move to a designated URL and a chapter move operation for a transition to a specific position of the content. For this reason, preparing all commands corresponding to various user operations in advance, and requesting the source device 10 to execute the processing corresponding to the user operation by such commands, by the sink device 20, are difficult. Accordingly, properly processing the user operation without decoding the content data (data of the interactive plane) in the source device 10 is difficult, and restrictions occur on the user operation in the transmission of the non-transcoding method.

In addition, for example, in a case where the content is transmitted by the non-transcoding method and the user is unaware of whether the content is transmitted by the transcoding method or the non-transcoding method, even if the user operates a button on the operation panel on the screen of the sink device 20, an operation corresponding to this operation is not executed, and confusion may occur in the user operation.

As explained above, however, the transmission of the non-transcoding method is advantageous in that video can be displayed on the screen of the sink device 20 with the original image quality, the power consumption of the source device 10 can be reduced, and a high-performance real-time encoder is not required.

For this reason, the present embodiment provides a function of seamlessly displaying the content by a hybrid-transcoding method which takes advantage of the non-transcoding method and which imposes no restrictions on the user operation in the sink device 20.

An example of transmitting a content in the hybrid-transcoding method will be explained with reference to FIGS. 8 to 10.

Figure 8:
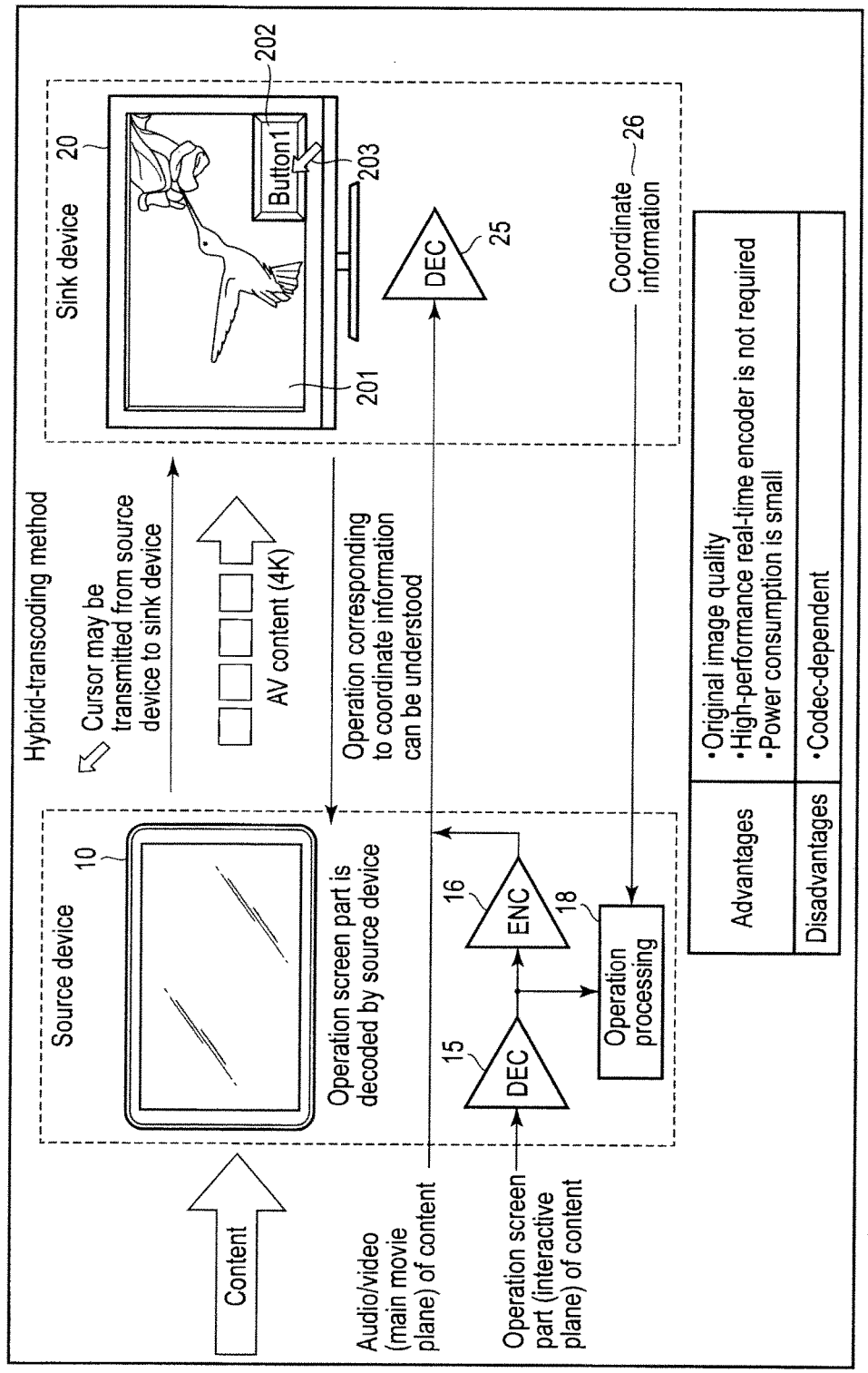
FIG. 8 is a view for explanation of an example in which a content is transmitted by a hybrid-transcoding method by the electronic device of the embodiment.

In the example illustrated in FIG. 8, the source device 10 decodes data corresponding to the operation screen portion (interactive plane) of content by the decoder 15, and encodes (re-encodes) the decoded data by the encoder 16. In other words, the source device 10 transcodes the data corresponding to the operation screen portion of the content. Then, the source device 10 transmits the original data corresponding to the audio/video portion (main movie plane) of the content and the transcoded data corresponding to the operation screen portion, to the sink device 20. It should be noted that the source device 10 may transmit the data relating to the cursor indicative of the position of the user operation to the sink device 20.

The sink device 20 decodes, by the decoder 25, the original data corresponding to the audio/video portion of the content and the transcoded data corresponding to the operation screen portion, which have been received from the source device 10. Then, the sink device 20 displays the video (main movie plane) 201 included in the content, and the operation screen (interactive plane) including the button 202, on the screen. The sink device 20 can also display the cursor 203 on the screen of the sink device 20, based on the data relating to the cursor transmitted from the source device 10.

When the content is displayed on the screen of the sink device 20, if a user operation on the content (for example, an operation of pressing the button 202) is executed on the sink device 20, the sink device 20 transmits the coordinate information 26 corresponding to the user operation to the source device 10 over the UIBC.

The source device 10 receives the coordinate information 26 corresponding to the user operation from the sink device 20, over the UIBC. Then, the source device 10 can recognize the user operation corresponding to the coordinate information 26 by using the content data decoded by the decoder 15, execute the operation processing 18 corresponding to the user operation, and reflect the processing result on the screen of the sink device 20.

It is assumed, as a more concrete example, that the user operation has been performed on the button 202 on the screen of the sink device 20 (for example, the operation of pressing the button 202 has been performed).

First, the sink device 20 detects coordinates corresponding to a position designated (selected) by the user operation, that is, coordinates in the button 202, and transmits coordinate information 26 including the detected coordinates to the source device 10.

The source device 10 receives the coordinate information 26 from the sink device 20, and detects that the coordinates indicated by the received coordinate information 26 correspond to the coordinates of the button on the interactive plane, by using the decoded data corresponding to the interactive plane. In other words, the source device 10 recognizes the user operation on the button 202 on the screen of the sink device 20 as the user operation on the button on the interactive plane based on the decoded data of the interactive plane. Then, the source device 10 can execute the operation processing 18 corresponding to the user operation on this button and reflect the processing result on the screen of the sink device 20.

Examples of the operation processing 18 include a content playback control (for example, playback, stop, pause, resume, fast forward, fast rewind, slow playback, and the like), processing of moving to a designated URL, a chapter transition processing and the like. As several examples, for example, when the button 202 is a pause button, the source device 10 stops sending the content of the main movie plane to the sink device 20 or continues transmission of a picture at a paused content position. As regards the interactive plane, the source device 10 continues decoding and encoding of the interactive plane corresponding to the paused content position (time position/playback position) and transmits the encoded data to the sink device 20.

In addition, the source device 10 transmits only predetermined pictures of pictures included in the main movie plane, in fast forward or fast rewind, and delays a transmission timing of the main movie plane, in slow playback.

In addition, if the button 202 is a chapter transition button, the source device 10 reads the main movie plane from the content position corresponding to the chapter associated with the button 202 by executing the operation processing 18, and transmits the read main movie plane to the sink device 20. In addition, at this time, if the interactive plane and main movie plane are synchronized in the original content, the source device 10 also executes decoding the interactive plane from the time position (playback position) corresponding to the chapter.

If the button 202 is a button for movement to a designated URL, the source device 10 accesses a Web page of this URL and displays the Web page. When the source device 10 displays the Web page, the source device 10 may encode the video displayed on the screen of the source device 10 and transmit the encoded data to the sink device 20, by switching the transmission method from the hybrid-transcoding method to the transcoding method.

In addition, when a user operation on the content has been performed on the source device 10, the source device 10 can execute the operation processing 18 corresponding to the user operation, with the content data decoded by the decoder 15, and reflect the processing result on the screen of the sink device 20.

Thus, since the source device 10 decodes the data of the interactive plane in the content data, the source device 10 can properly execute processing corresponding to the user operation in the source device 10 or the sink device 20 and improve the user operability. In addition, since the source device 10 transmits the original data of the main movie plane to the sink device 20, video can be displayed with the original image quality on the screen of the sink device 20. Moreover, since the data of the main movie plane is neither decoded nor encoded in the source device 10, the power consumption can be decreased, and a high-performance real-time encoder (i.e., an encoder capable of processing a large-sized image in real time) is not required.

In the example illustrated in FIG. 9, the source device 10 decodes the content data by the decoder 15. The source device 10 displays the video (main movie plane) 171 included in the content, and the operation screen (interactive plane) including the button 172, on the screen, by using the decoded data. In addition, the source device 10 transmits the original content data to the sink device 20. It should be noted that the source device 10 may transmit the data relating to the cursor indicative of the position of the user operation to the sink device 20.

The sink device 20 decodes the original content data received from the source device 10, by the decoder 25. Then, the sink device 20 displays the video (main movie plane) 201 included in the content, and the operation screen (interactive plane) including the button 202, on the screen. The sink device 20 can also display the cursor 203 on the screen of the sink device 20, based on the data relating to the cursor transmitted from the source device 10.

When the content is displayed on the screen of the sink device 20, if a user operation on the content is performed on the sink device 20, the sink device 20 transmits the coordinate information 26 corresponding to the user operation to the source device 10 over the UIBC.

The source device 10 receives the coordinate information 26 corresponding to the user operation from the sink device 20, over the UIBC. Then, the source device 10 can recognize the user operation corresponding to the coordinate information 26 by using the content data decoded by the decoder 15, execute the operation processing 18 corresponding to the user operation, and reflect the processing result on the screen of the sink device 20. In addition, when a user operation on the content has been performed on the source device 10, the source device 10 can execute the operation processing 18 corresponding to the user operation, with the content data decoded by the decoder 15, and reflect the processing result on the screen of the sink device 20.

Thus, since the source device 10 decodes the content data, the source device 10 can properly execute processing corresponding to the user operation in the source device 10 or the sink device 20 and improve the user operability. In addition, since the source device 10 transmits the original content data to the sink device 20, video can be displayed with the original image quality on the screen of the sink device 20. Furthermore, since the decoded content data is not encoded (re-encoded) in the source device 10, the power consumption can be decreased, and a high-performance real-time encoder (an encoder capable of processing a large-sized image in real time) is not required.

In the example illustrated in FIG. 9, the video (main movie plane) 171 included in the content is full-screen displayed on the display screen. For example, however, if the video of content is displayed on only a part of the screen (window display or the like) in accordance with the user operation, the source device 10 may encode the entire video displayed on the display screen and transmit the encoded video by switching the transmission method from the hybrid-transcoding method to the transcoding method. Conversely, if the content video is changed to full-screen display during the transmission of the transcoding method, the source device 10 may switch the transmission method to the hybrid-transcoding method.

Figure 10:
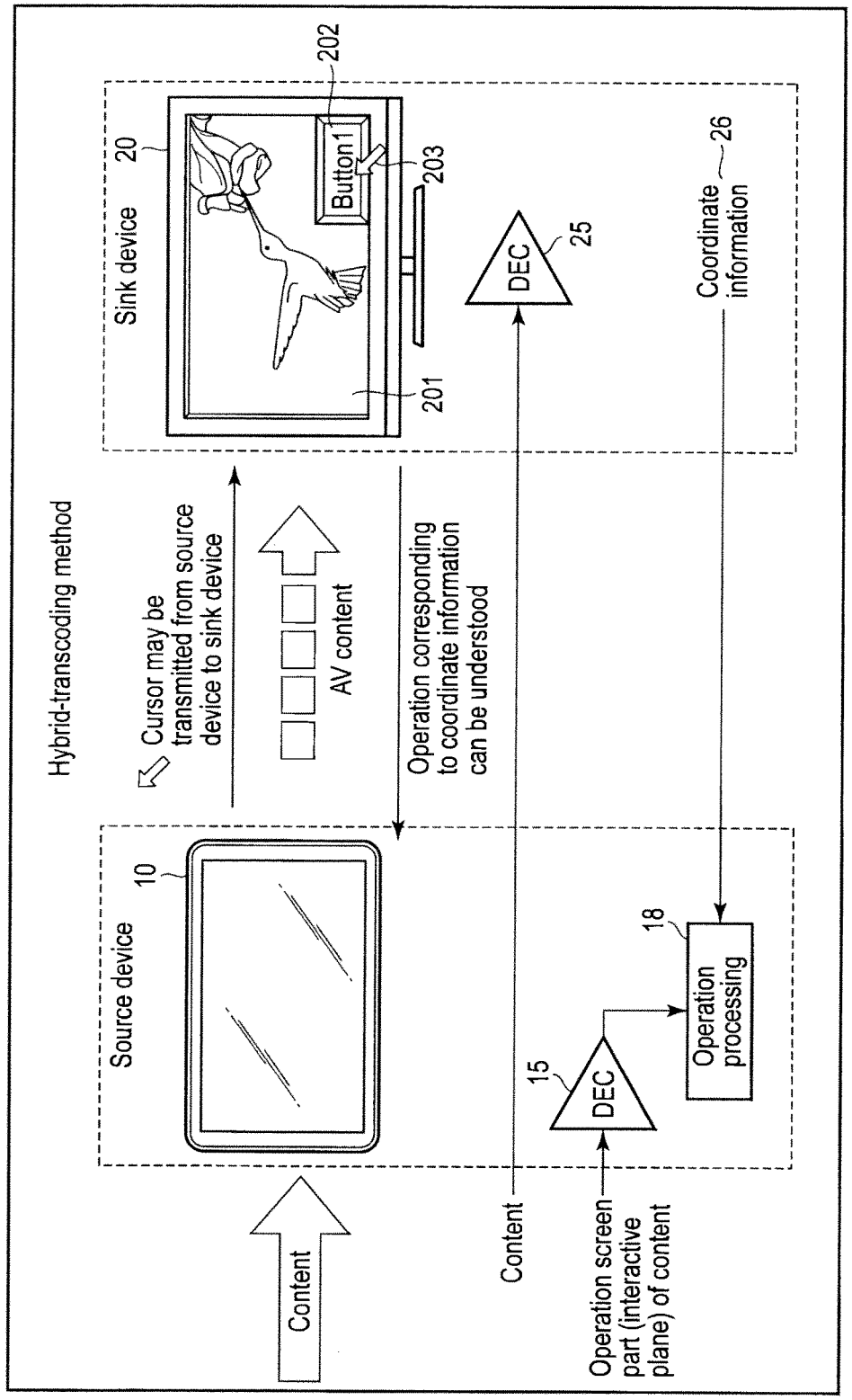
FIG. 10 is a view for explanation of yet another example in which a content is transmitted by a hybrid-transcoding method by the electronic device of the embodiment.

Moreover, in the example illustrated in FIG. 10, the source device 10 decodes data corresponding to the operation screen portion (interactive plane) of the content by the decoder 15. In addition, the source device 10 transmits the original content data to the sink device 20. It should be noted that the source device 10 may transmit the data relating to the cursor indicative of the position of the user operation to the sink device 20.

The sink device 20 decodes the original content data received from the source device 10, by the decoder 25. Then, the sink device 20 displays the video (main movie plane) 201 included in the content, and the operation screen (interactive plane) including the button 202, on the screen. The sink device 20 can also display the cursor 203 on the screen of the sink device 20, based on the data relating to the cursor transmitted from the source device 10.

When the content is displayed on the screen of the sink device 20, if a user operation on the content is performed on the sink device 20, the sink device 20 transmits the coordinate information 26 corresponding to the user operation to the source device 10 over the UIBC.

The source device 10 receives the coordinate information 26 corresponding to the user operation from the sink device 20, over the UIBC. Then, the source device 10 can recognize the user operation corresponding to the coordinate information 26 by using the content data decoded by the decoder 15, execute the operation processing 18 corresponding to the user operation, and reflect the processing result on the screen of the sink device 20.

In addition, when a user operation on the content has been performed on the source device 10, the source device 10 can execute the operation processing 18 corresponding to the user operation, with the content data decoded by the decoder 15, and reflect the processing result on the screen of the sink device 20.

Thus, since the source device 10 decodes the data of the interactive plane, the source device 10 can properly execute processing corresponding to the user operation in the source device 10 or the sink device 20 and improve the user operability. In addition, since the source device 10 transmits the original content data to the sink device 20, video can be displayed with the original image quality on the screen of the sink device 20. Furthermore, since the data of the main movie plane is neither decoded nor encoded and the data of the interactive plane is not encoded (re-encoded) in the source device 10, the power consumption can be decreased, and a high-performance real-time encoder (an encoder capable of processing a large-sized image in real time) is not required.

Next, an example of a functional configuration of the content transmission program 103B executed by the source device 10 will be explained with reference to FIG. 11. The source device 10 includes a function of transmitting the content data by the hybrid-transcoding method. Original content data is content data encoded by an arbitrary codec (codec scheme), and includes first data (data of a main movie plane) for displaying video and second data (data of an interactive plane) for displaying an object (or objects) which can be operated by the user.

The source device 10 includes, for example, a controller 31, a content processor 32, a transmitter 33, a display processor 34, an operation processor 36, and a receiver 37. In addition, the sink device 20, which receives the content, includes, for example, a receiver 41, a content processor 42, a display processor 43, a transmitter 44, and an operation processor 45.

The controller 31 of the source device 10 controls operations of the respective modules in the content transmission program 103B. The controller 31 controls processing (decode, encode, and the like) on the content data by the content processor 32. The controller 31 outputs, for example, a control signal for enabling or disabling a function of the content processor 32 to the content processor 32. The content processor 32 is capable of executing processing for displaying (outputting) the content on the source device 10 and processing for transmitting the content to the sink device 20, in accordance with a control signal output by the controller 31.

When the content is transmitted to the sink device 20 in the hybrid-transcoding method, the content processor 32 and the transmitter 33 transmit the content data, at least a part of which is not transcoded (for example, content data in which the main movie plane is not transcoded) to the sink device 20. The transmitter 33 transmits the content data to the sink device 20 via, for example, a wireless connection transmission path (for example, a wireless connection transmission path conforming to Wi-Fi Direct) which is established between the source device 10 and the sink device 20. Before transmitting the content data, the transmitter 33 can notify the sink device 20 which transmission method of a transcoding method, a non-transcoding method and a hybrid-transcoding method is used to transmit the content data. The sink device 20 can thereby process the content data transmitted from the source device 10, in accordance with the notified transmission method. In addition, in accordance with the notified transmission method, the sink device 20 can display information indicative of the transmission method on the screen and notify the user of the current content transmission method.

The content processor 32 decodes at least a part of the content data (for example, the data of the interactive plane). In accordance with a user operation in the source device 10 or the sink device 20, the operation processor 36 executes processing corresponding to the user operation by using at least a part of the content data decoded by the content processor 32.

Next, an example of the functional configuration of the content processor 32 for displaying (outputting) the content on the source device 10 will be explained with reference to FIG. 12. The content processor 32 is configured to decode the content data and to generate the video displayed on the screen of the LCD 17A and the audio output to the speaker 13 or the like.

First, a switch 502 distributes data of layers (planes) in content data 521 to decoders 511 to 515 corresponding to the layers respectively. An audio decoder 511 decodes a distributed audio stream (audio data) 522. The audio, which is to be output by the speaker or the like, is thereby generated. A video decoder 512 decodes a distributed video stream (video data) 523, thereby generating a video plane. A presentation graphics (PG) decoder 513 decodes a distributed PG stream (PG data) 524, thereby generating a presentation plane. An interactive graphics (IG) decoder 514 decodes a distributed IG stream (IG data) 525, thereby generating an IG plane. A text decoder 515 decodes a distributed text stream (text data) 526, thereby generating a text. A multiplexer 516 superimposes (multiplexes) the video plane, the IG plane, the PG plane, and the text. An image, which is to be displayed on the screen, is thereby generated.

The display processor 34 displays the image generated by the content processor 32, on the screen of the source device 10 (LCD 17A). The audio generated by the content processor 32 is output by the speaker 13 or the like.

The operations of the above-described respective components in the content processor 32 can be set to be enabled or disabled in response to an enable/disable control signal by the controller 31. For example, when the video is not displayed on the screen of the source device (tablet computer) 10 in a case where the content data is transmitted in the hybrid-transcoding method, the controller 31 outputs to the content processor 32 control signals which disable the video decoder 512 and the audio decoder 511 and which enable the IG decoder 514, the text decoder 515, and the PG decoder 513. Thus, the data of the interactive plane (i.e., the data of the IG plane 525 and the data of the PG plane 524) is decoded, and the data of the main movie plane (i.e., the data of the video plane 523 and the audio data 522) is not decoded. In other words, the data of the original main movie plane is allowed to pass through the video decoder 512 and the audio decoder 511, and the IG decoder 514, the text decoder 515 and the PG decoder 513 are allowed to decode the data of the interactive plane required to process the user operation.

Examples of the functional configuration of the content processor 32 for transmitting the content data in the hybrid-transcoding method will be explained with reference to FIGS. 13 to 16. In the examples illustrated in FIGS. 13 to 16, a part of the components of the content processor 32 shown in FIG. 12 is omitted and the components whose operations are enabled are shown to simplify explanations.

Figure 13:
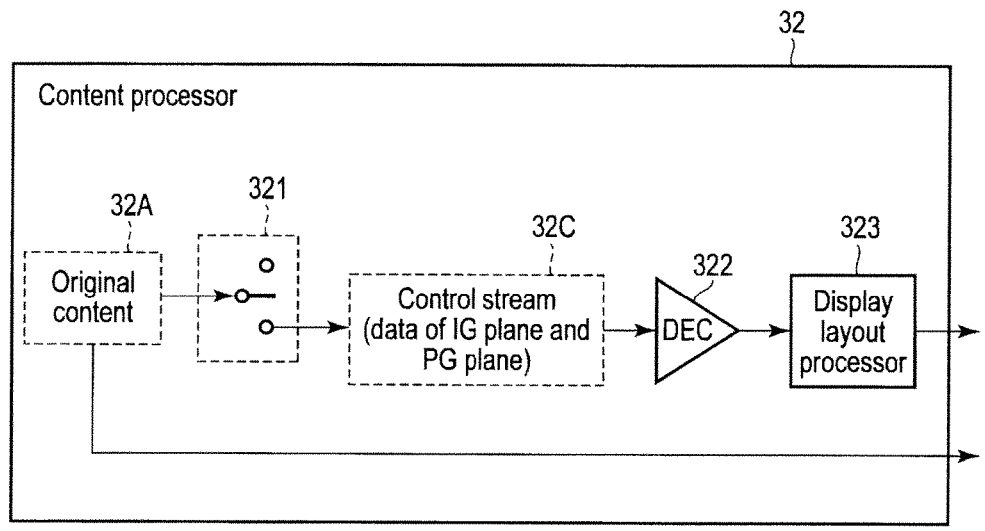
FIG. 13 is a block diagram showing a second example of a functional configuration of the content processor in the content transmission program of FIG. 11.

In the example illustrated in FIG. 13, the content processor 32 output content data, which is encoded and includes an audio/video stream (first data) for displaying the video and a control stream (second data) 32C for displaying an object which can be operated by the user, as it is (i.e., output the content data to which any processing is not subjected), and the transmitter 44 transmits the content data to the sink device (external electronic device) 20. In addition, the content processor 32 decodes the control stream (second data) 32C in the content data. When the video and the object are displayed on the screen of the sink device 20 by using the content data, the operation processor 36 executes, in response to a user operation on the object, processing corresponding to the user operation by using the decoded control stream (second data) 32C.

More specifically, the content processor 32 includes a switch 321, a decoder 322 and a display layout processor 323.

The switch 321 allocates a control stream 32C (for example, data of the IG plane and the PG plane) in original content data 32A to the decoder 322. The decoder 322 decodes the allocated control stream 32C. The display layout processor 323 determines a layout (screen configuration) of an image (or images) and text corresponding to the decoded data. The display layout processor 323 may generate an image of an operation screen including a text and a button (object) for the user operation, based on the determined layout. In addition, the original content data 32A passes through the content processor 32. The original content data 32A is transmitted to the sink device 20 by the transmitter 33.

The display processor 34 may display the image of the operation screen on the screen of the source device 10. In addition, in accordance with a user operation on an object (operation screen) displayed on the screen of the source device 10, the transmitter 33 may transmit operation data indicative of the user operation to the sink device 20.

Figure 14:
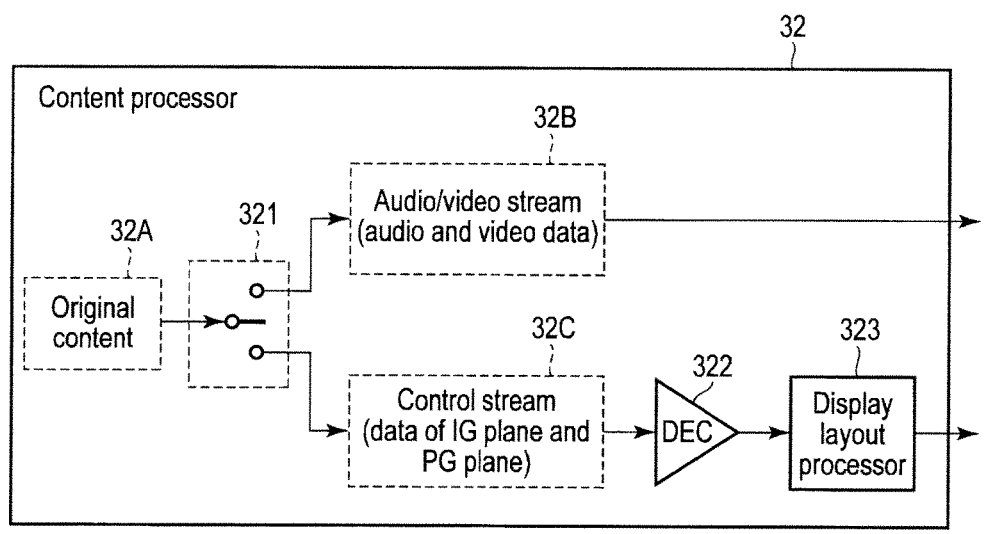
FIG. 14 is a block diagram showing a third example of a functional configuration of the content processor in the content transmission program of FIG. 11.

In the example illustrated in FIG. 14, the content processor 32 includes the switch 321, the decoder 322, and the display layout processor 323.

The switch 321 outputs the audio/video stream 32B (for example, audio and video data) in the original content data 32A as it is. In addition, the switch 321 allocates a control stream 32C (for example, data of the IG plane and the PG plane) in original content data 32A to the decoder 322. The decoder 322 decodes the allocated control stream 32C. The display layout processor 323 determines a layout (screen configuration) of an image (or images) and text corresponding to the decoded data. The display layout processor 323 may generate an image of an operation screen including a text and a button (object) for the user operation, based on the determined layout.

The transmitter 33 transmits the original audio/video stream 32B and the decoded control stream 32C (i.e., the image (layer) obtained from the control stream 32C) to the sink device 20. The original audio/video stream 32B and the decoded control stream 32C may include synchronization data (for example, a time stamp) for synchronizing the two streams (data). The video and audio (main movie plane) and the operation screen (interactive plane) can be linked by the synchronization data. The display processor 34 may display the image of the operation screen on the screen of the source device 10.

The sink device 20 can receive the decoded control stream 32C and display the operation screen by using the decoded control stream 32C. In this way, since the processing relating to the operation (i.e., the processing on the interactive plane) is executed by the source device 10 alone, a trouble which may be caused by executing processing relating to the operation by multiple devices can be avoided.

In the example illustrated in FIG. 15, the content processor 32 includes the switch 321, the decoder 322, the display layout processor 323 and an encoder 324.

The switch 321 outputs the audio/video stream 32B (for example, audio and video data) in the original content data 32A as it is. In addition, the switch 321 allocates a control stream 32C (for example, data of the IG plane and the PG plane) in original content data 32A to the decoder 322.

The decoder 322 decodes the allocated control stream 32C. The display layout processor 323 determines a layout (screen configuration) of an image (or images) and text corresponding to the decoded data. The display layout processor 323 may generate an image of an operation screen including a text and a button (object) for the user operation, based on the determined layout. Next, the encoder 324 encodes (re-encodes) the decoded control stream 32C. The encoder 324 encodes the decoded control stream 32C, for example, by a codec (codec scheme) suitable for the processing executed by the sink device 20. The control stream 32C is therefore transcoded into a codec (codec scheme) which is suitable for the processing executed by the sink device 20, by the decoder 322 and the encoder 324.

The transmitter 33 transmits the original audio/video stream 32B and the transcoded control stream 32C to the sink device 20. In addition, the display processor 34 may display an image of an operation screen on the screen of the source device 10.

In the example illustrated in FIG. 16, the content processor 32 includes the switch 321, the decoders 322 and 325, and the display layout processor 323.

The switch 321 allocates the audio/video stream 32B (for example, audio and video data) in the original content data 32A to the decoder 325, and allocates the control stream 32C (for example, the data of the IG plane and the PG plane) in the original content data 32A to the decoder 322.

The decoder 325 decodes the allocated audio/video stream 32B, thereby generating the video and audio. In addition, the decoder 322 decodes the allocated control stream 32C. The display layout processor 323 determines a layout (screen configuration) of an image (or images) and text corresponding to the decoded data. The display layout processor 323 generates an image of an operation screen including a text and a button (object) for the user operation, based on the determined layout.

In addition, the original content data 32A passes through the content processor 32. The transmitter 33 transmits the original content data 32A to the sink device 20. In addition, the display processor 34 superimposes the image of the operation screen on the video, and displays the superimposed image (video) on the screen of the source device 10.

The content processor 32 outputs the decoded control stream 32C (or the decoded data of the interactive plane) to the operation processor 36. In addition, the content processor 32 may save (store) in the work memory 35 at least a part of the decoded control stream 32C and at least a part of the audio/video stream 32B (i.e., the data of the main movie plane), which is related to at least the part of the decoded control stream 32C.

The receiver 41 of the sink device 20 receives the content data transmitted from the source device 10 (transmitter 33). The content processor 42 decodes the content data, thereby generating an image (video) displayed on the screen, and the audio output by the speaker or the like. The processing executed by the content processor 42 is the same as the processing explained with reference to, for example, FIG. 12.

The display processor 43 displays the image (video) generated by the content processor 42, on the screen of the sink device 20. In addition, the display processor 43 also outputs the audio generated by the content processor 42, by the speaker or the like of the sink device 20.

The content (image) displayed on the screen of the sink device 20 may include an object (interactive plane) for a user operation, such as a button, as shown in FIG. 5. In the source device 10 and the sink device 20, the user can execute an operation on the object by using a remote controller or various pointing devices. Examples of the user operation include operations for controlling playback of the content (for example, playback, stop, pause, resume, fast forward, fast rewind, slow playback, and the like), an operation for changing a content display mode (for example, full-screen display), an operation for movement to a designated URL, an operation for varying a sound volume of the content, and the like.

In addition, the user operation may be a user operation executed by voice with use of a microphone. The source device 10 or the sink device 20 may detect a user operation of a command such as "playback" or "stop" from the audio (voice), by analyzing the audio data input with use of the microphone, or may detect from the audio (voice) a user operation such as the move, click or tap of a position designated by a pointing device such as a mouse.

Processing in a case where the user operation has been executed in the sink device 20 and processing in a case where the user operation has been executed in the source device 10 will be hereinafter explained.

First, the user operation executed in the sink device 20 is explained.

In response to detection of the user operation on an object displayed on the screen of the sink device 20, the transmitter 44 of the sink device 20 transmits operation data corresponding to the user operation to the source device 10. The operation data includes coordinate data indicative of a position on the screen of the sink device 20, at which the user operation has been executed. In addition, the operation data may include time data (time stamp) indicative of a playback position of the video (content) at a time when the user operation was executed.

The receiver 37 of the source device 10 receives the operation data corresponding to the user operation from the sink device 20. The operation processor 36 recognizes the user operation detected in the sink device 20, by using the coordinate data in the operation data and the decoded data of the interactive plane (i.e., the decoded control stream 32C). Based on the coordinates on the screen, which are indicated by the coordinate data, for example, the operation processor 36 recognizes the object (for example, the button 202) operated by the user, from the objects on the interactive plane. The operation processor 36 executes processing corresponding to the recognized user operation (i.e., processing corresponding to the user operation on the recognized object). Then, the transmitter 33 transmits the content data corresponding to the processing result to the sink device 20.

The operation processor 36 may execute the processing corresponding to the user operation by using the coordinate data and time data included in the operation data, and the decoded data of the interactive plane. In this case, the operation processor 36 recognizes the object operated by the user from the objects on the interactive plane based on the playback position (playback time) indicated by the time data and the coordinates on the screen indicated by the coordinate data, and executes the process corresponding to the user operation on this object.

In addition, for example, when the user operation is an operation for controlling the content playback (for example, playback, stop, pause, resume, fast forward, fast rewind, slow playback, and the like), the operation processor 36 and the transmitter 33 transmit the content data, which starts from the playback position corresponding to the user operation, to the sink device 20. If the user operation is an operation for the rewind to a predetermined playback position, the operation processor 36 can identify a position on the content data, which corresponds to the predetermined playback position, and acquire the content data which is to be transmitted to the sink device 20, by using the decoded content data saved (stored) in the work memory 35.

In addition, if the user operation is an operation for changing the content display mode (for example, full-screen display), the transmitter 33 transmits content data for displaying a content in the display mode designated by the user operation to the sink device 20. If the user operation is an operation for displaying content of a predetermined URL, the transmitter 33 transmits data of the content data of the predetermined URL to the sink device 20. In addition, if the user operation is an operation for varying the sound volume of the content, the transmitter 33 transmits content data with a varied sound volume to the sink device 20.

If at least a part of the content (for example, an operation screen) is displayed on the screen of the source device 10, the display processor 34 may change the display content in accordance with the processing result corresponding to the user operation.

The receiver 41 of the sink device 20 receives the content data based on the processing result of the user operation, from the source device 10. Then, the content processor 42 and the display processor 43 display the video on the screen of the sink device 20 by using the received content data. In addition, the content processor 42 and the display processor 43 may output the audio with the speaker or the like by using the received content data.

When the user operation can be processed by the sink device 20, the transmitter 44 of the sink device 20 may not transmit the operation data to the source device 10, but may execute the processing corresponding to the user operation by the operation processor 45 of the sink device 20. For example, if the user operation is an operation of displaying content in a full-screen mode, the operation processor 45 allows the display processor 43 to display the content in a full-screen mode. If the user operation is an operation for displaying a content of a predetermined URL, the operation processor 45 accesses the predetermined URL and receives the corresponding content data. In addition, if the user operation is an operation for varying the sound volume of content, the operation processor 45 varies the volume of the speaker or the like provided on the sink device 20.

Next, a case in which a user operation has been executed in the source device 10 is explained.

First, when the user operation is detected, the operation processor 36 of the source device 10 executes processing corresponding to the user operation by using the data of the interactive plane (i.e., the decoded control stream 32C). Based on the position (coordinates) on the screen at which the user operation has been detected, for example, the operation processor 36 recognizes the object (for example, the button 172) operated by the user, from the objects on the interactive plane, and executes processing corresponding to the user operation on the recognized object. Then, the transmitter 33 transmits the content data corresponding to the processing result to the sink device 20. If at least a part of content (for example, an operation screen) is displayed on the screen of the source device 10, the display processor 34 may change the display in accordance with the processing result corresponding to the user operation.

The receiver 41 of the sink device 20 receives the content data based on the processing result of the user operation, from the source device 10. Then, the content processor 42 and the display processor 43 display the video on the screen of the sink device 20 by using the received content data. In addition, the content processor 42 and the display processor 43 may output the audio with the speaker or the like by using the received content data.

When a user operation is detected in the source device 10, the transmitter 33 of the source device 10 may transmit the operation data corresponding to the user operation to the sink device 20. The receiver 41 of the sink device 20 receives the operation data, and the operation processor 45 recognizes the user operation detected by the source device 10 by using the received operation data and the decoded data of the interactive plane, and executes the processing corresponding to the recognized user operation.

In this way, by processing the user operation detected in the source device 10, the user can use, for example, the touch panel 17B provided on the source device 10 which is the tablet computer, as a touch pad of the sink device 20.

The transmission of the above-explained hybrid-transcoding method may be realized not by the software such as the content transmission program 103B, but by hardware.

Next, processing in a case where the content is transmitted by the source device 10 and displayed by the sink device 20 will be explained with reference to flowcharts of FIGS. 17 to 23. To simplify explanations, it is assumed that a link between the source device 10 and the sink device 20 is established by establishing a connection (wireless connection) between the devices and executing a session for pairing.

FIG. 17 shows a first example of the procedure of content transmission processing executed by the source device 10.

First, the controller 31 determines whether the content data should be transmitted to the sink device 20 (block B101). For example, if an operation for displaying (outputting) the content on the sink device 20 is detected, the controller 31 determines that the content data is transmitted to the sink device 20. If the content data is not transmitted (No in block B101), the flow returns to block B101, and it is determined again whether the content data should be transmitted to the sink device 20.

If the content data is transmitted (Yes in block B101), the transmitter 33 transmits the content data (original content data) to the sink device 20 (block B102). Next, the content processor 32 decodes the data of the interactive plane in the content data (block B103). The content processor 32 may temporarily store the decoded data of the interactive plane in the work memory 35. In addition, the display processor 34 may display an image corresponding to the interactive plane, on the screen of the display 17, by using the decoded data of the interactive plane (block B104).

FIG. 18 shows a first example of the procedure of content display processing executed by the sink device 20. In the content display processing, the sink device 20 plays back the content by using the content data which has been transmitted from the source device 10 in the processing shown in FIG. 17.

First, the receiver 41 receives the content data (original content data) from the source device 10 (block B151). The content processor 42 decodes the received content data (block B152). The content processor 42 superimposes images of respective planes using the decoded data (block B153). The content processor 42 multiplexes, for example, an image of the main movie plane, an image of the presentation plane and an image of the interactive plane. Then, the display processor 43 displays the superimposed images on the screen (block B154).

Figure 19:
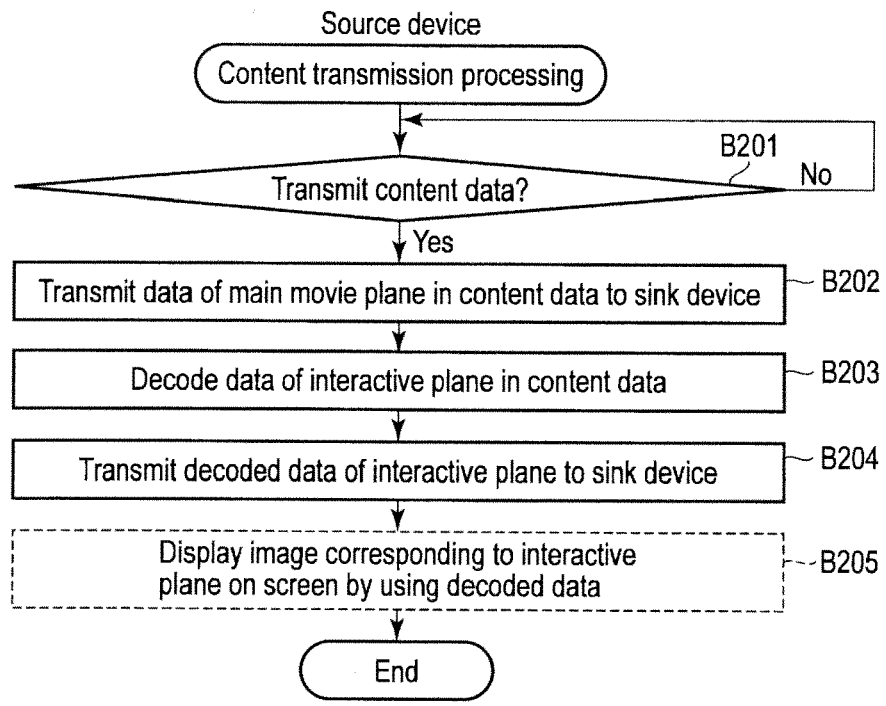
FIG. 19 is a flowchart showing a second example of the procedure of content display processing executed by an electronic device (sink device) of the embodiment.

FIG. 19 shows a second example of the procedure of content transmission processing executed by the source device 10.

First, the controller 31 determines whether the content data should be transmitted to the sink device 20 (block B201). If the content data is not transmitted (No in block B201), the flow returns to block B201, and it is determined again whether the content data should be transmitted to the sink device 20.

If the content data is transmitted (Yes in block B201), the transmitter 33 transmits the data (original data) of the main movie plane in the content data to the sink device 20 (block B202). Next, the content processor 32 decodes the data of the interactive plane in the content data (block B203). The content processor 32 may temporarily store the decoded data of the interactive plane in the work memory 35. The transmitter 33 transmits the decoded data of the interactive plane to the sink device 20 (block B204). The data of the presentation plane may be treated as either the data of the main movie plane or the data of the interactive plane.

In addition, the display processor 34 may display an image corresponding to the interactive plane, on the screen of the display 17, by using the decoded data of the interactive plane (block B205).

Figure 20:
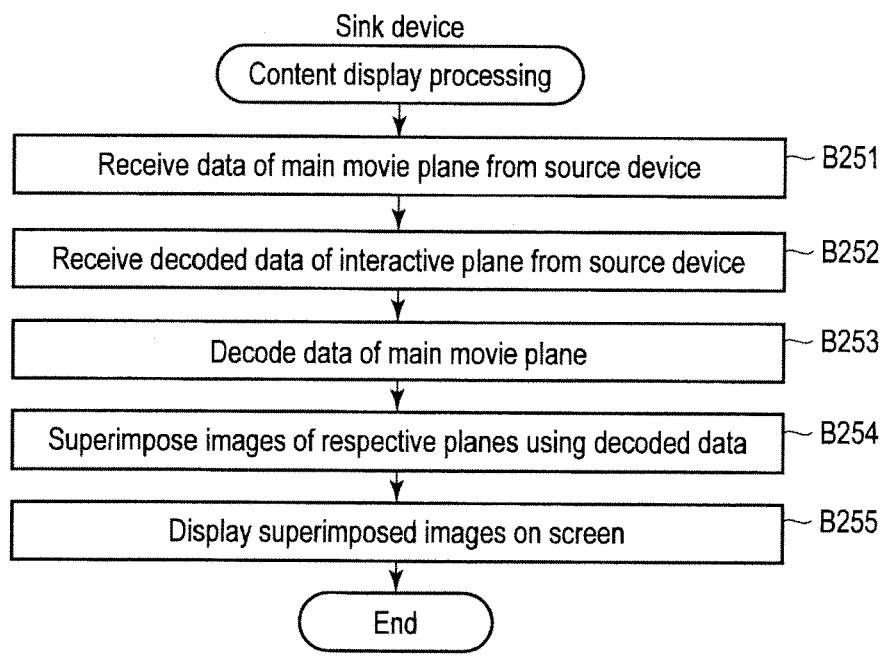
FIG. 20 is a flowchart showing a second example of the procedure of content display processing executed by an external electronic device (sink device) receiving a content from the electronic device of the embodiment.

FIG. 20 illustrates a second example of the procedure of the content display processing executed by the sink device 20. In the content display processing, the sink device 20 plays back the content by using the content data which has been transmitted from the source device 10 in the processing shown in FIG. 19.

First, the receiver 41 receives the data (original data) of the main movie plane from the source device 10 (block B251) and receives the decoded data of the interactive plane (block B252). The content processor 42 decodes the received data of the main movie plane (block B253). The content processor 42 superimposes images of respective planes using the decoded data (block B254). The content processor 42 multiplexes, for example, an image of a main movie plane using the decoded data of the movie plane and an image of an interactive plane using the received data of the interactive plane. The content processor 42 may superimpose the image of the interactive plane on the image of the main movie plane or may set the image of the interactive plane to be an embedded image by Picture-in Picture. The data of the presentation plane may be treated as either the data of the main movie plane or the data of the interactive plane. Then, the display processor 43 displays the superimposed images on the screen (block B255).

FIG. 21 shows a third example of the procedure of the content transmission processing executed by the source device 10.

First, the controller 31 determines whether the content data should be transmitted to the sink device 20 (block B301). If the content data is not transmitted (No in block B301), the flow returns to block B301, and it is determined again whether the content data should be transmitted to the sink device 20.

If the content data is transmitted (Yes in block B301), the transmitter 33 transmits the data (original data) of the main movie plane in the content data to the sink device 20 (block B302). Next, the content processor 32 decodes the data of the interactive plane in the content data (block B303). The content processor 32 may temporarily store the decoded data of the interactive plane in the work memory 35. The content processor 32 encodes (re-encodes) the decoded data of the interactive plane (block B304). The content processor 32 encodes the decoded data of the interactive plane with, for example, by a codec (codec scheme) suitable for the processing executed by the sink device 20. The transmitter 33 transmits the encoded (transcoded) data of the interactive plane to the sink device 20 (block B305). The data of the presentation plane may be treated as either the data of the main movie plane or the data of the interactive plane.

In addition, the display processor 34 may display an image corresponding to the interactive plane, on the screen of the display 17, by using the decoded data of the interactive plane (block B306).

FIG. 22 shows a third example of the procedure of the content display processing executed by the sink device 20. In this content display processing, the sink device 20 plays back the content by using the content data which has been transmitted from the source device 10 in the processing shown in FIG. 21.

First, the receiver 41 receives the data (original data) of the main movie plane from the source device 10 (block B351) and receives the encoded (transcoded) data of the interactive plane (block B352). The content processor 42 decodes the received data of the main movie plane (block B353) and decodes the received data of the interactive plane (block B354). The content processor 42 superimposes images of respective planes using the decoded data (block B355). The content processor 42 multiplexes, for example, an image of the main movie plane using the decoded data of the movie plane and an image of the interactive plane using the decoded data of the interactive plane. The data of the presentation plane may be treated as either the data of the main movie plane or the data of the interactive plane. Then, the display processor 43 displays the superimposed images on the screen (block B356).

FIG. 23 shows a fourth example of the procedure of the content transmission processing executed by the source device 10.

First, the controller 31 determines whether the content data should be transmitted to the sink device 20 (block B401). If the content data is not transmitted (No in block B401), the flow returns to block B401, and it is determined again whether the content data should be transmitted to the sink device 20.

If the content data is transmitted (Yes in block B401), the transmitter 33 transmits the content data (original content data) to the sink device 20 (block B402). Then, the content processor 32 decodes the content data (block B403). The content processor 32 may temporarily store the decoded content data in the work memory 35. In addition, the content processor 32 superimposes images of respective planes using the decoded data (block B404). The content processor 42 multiplexes, for example, an image of the main movie plane, an image of the presentation plane and an image of the interactive plane. Then, the display processor 34 displays the superimposed images on the screen (block B405).

The content display processing executed by the sink device 20, using the content data (original content data) transmitted from the source device 10 in the processing of FIG. 23 is the same as that explained with reference to FIG. 18.

Next, processing corresponding to user operations on the content will be explained with reference to flowcharts of FIGS. 24 to 26.

Figure 24:
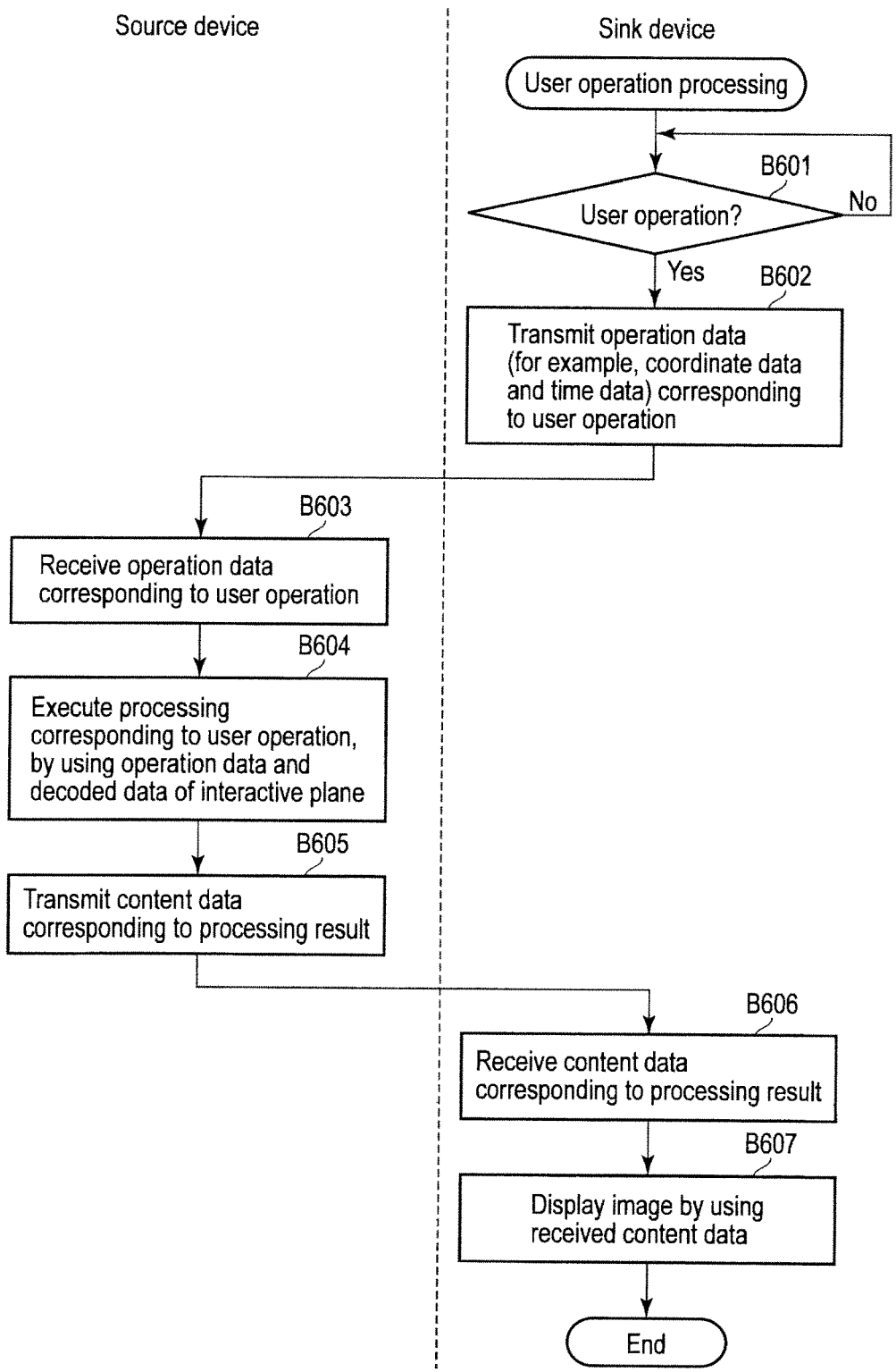
FIG. 24 is a flowchart showing a first example of the procedure of user operation processing executed by the electronic device (source device) of the embodiment and the external electronic device (sink device).

FIG. 24 shows a first example of the procedure of user operation processing executed by the source device 10 and the sink device 20.

First, the operation processor 45 of the sink device 20 determines whether the user operation on the content has been detected (block B601). If the user operation has not been detected (No in block B601), the flow returns to block B601 and it is determined again whether the user operation on the content has been detected. On the other hand, if the user operation has been detected (Yes in block B601), the transmitter 44 transmits operation data (for example, coordinate data and time data) corresponding to the user operation to the source device 10 (block B602).

Next, the receiver 37 of the source device 10 receives the operation data corresponding to the user operation from the sink device 20 (block B603). The operation processor 36 recognizes the user operation detected by the sink device 20, by using the operation data and the decoded data of the interactive plane, and executes processing corresponding to the recognized user operation (block B604). Then, the transmitter 33 transmits the content data corresponding to the processing result to the sink device 20 (block B605). If at least a part of the content is displayed on the screen of the source device 10, the display processor 34 may change the display in accordance with the processing result corresponding to the user operation.

The receiver 41 of the sink device 20 receives the content data corresponding to the processing result of the user operation from the source device 10 (block B606). Then, the content processor 42 and the display processor 43 display an image on the screen by using the received content data (block B607).

FIG. 25 shows a second example of the procedure of user operation processing executed by the source device 10 and the sink device 20.

First, the operation processor 36 of the source device 10 determines whether the user operation on the content has been detected (block B701). If the user operation has not been detected (No in block B701), the flow returns to block B701 and it is determined again whether the user operation on the content has been detected. On the other hand, if the user operation has been detected (Yes in block B701), the operation processor 36 and the content processor 32 execute processing corresponding to the user operation, by using the decoded data of the interactive plane (block B702). Then, the transmitter 33 transmits the content data corresponding to the processing result to the sink device 20 (block B703). If at least a part of the content is displayed on the screen of the source device 10, the display processor 34 may change the display in accordance with the processing result corresponding to the user operation.

Next, the receiver 41 of the sink device 20 receives the content data corresponding to the processing result of the user operation from the source device 10 (block B704). The content processor 42 and the display processor 43 display an image on the screen by using the received content data (block B705).

FIG. 26 shows a third example of the procedure of user operation processing executed by the source device 10 and the sink device 20.

First, the operation processor 36 of the source device 10 determines whether the user operation on the content has been detected (block B801). If the user operation has not been detected (No in block B801), the flow returns to block B801 and it is determined again whether the user operation on the content has been detected. On the other hand, if the user operation has been detected (Yes in block B801), the transmitter 33 transmits operation data (for example, coordinate data and time data) corresponding to the user operation to the sink device 20 (block B802).

Next, the receiver 41 of the sink device 20 receives the operation data corresponding to the user operation from the source device 10 (block B803). The operation processor 45, the content processor 42 and the display processor 43 recognize the user operation detected by the source device 10, by using the received operation data and the decoded data of the interactive plane, and execute processing corresponding to the recognized user operation (block B804).

As explained above, according to the present embodiment, an operation on the object in the content can be processed properly when the content is seamlessly displayed between devices. The transmitter 33 of the source device 10 transmits content data to the sink device 20, the content data being encoded and including first data (data of the main movie plane) to display the video and second data (data of the interactive plane) to display an object capable of being operated by a user. The content processor 32 decodes the second data. The operation processor 36 executes, in accordance with a user operation on the object, processing corresponding to the user operation by using the decoded second data if the sink device 20 displays the video and the object on a screen by using the received content data.

Thus, even in the method in which original content data, not transcoded, is transmitted to the sink device 20, by decoding the second data (data of the interactive plane) in the source device 10, the source device 10 can recognize the user operation on the object and implement the operation on which the user operation is reflected.

All the processing procedure of the embodiment explained with reference to the flowcharts of FIGS. 17 to 26 can be executed by software. Thus, the same advantageous effects as those of the present embodiment can easily be obtained simply by installing a computer program, which executes the process procedures, into an ordinary computer through a computer-readable storage medium which stores the computer program, and by executing the computer program.

Various modules of the explained system can be implemented as modules of software applications, hardware and/or software, or components on at least one computer such as a server. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a memory;
    one or more hardware processors configured to:
        acquire content data comprising first encoded data of a video image and second encoded data of a user interface;
        decode the second encoded data to generate second decoded data of the user interface without decoding the first encoded data; and
        store the second decoded data of the user interface in the memory;
    a transmitter configured to transmit the content data comprising the first encoded data and the second encoded data, to a first electronic apparatus, wherein the first encoded data and the second encoded data are decoded to generate third decoded data of the video image and fourth decoded data of the user interface at the first electronic apparatus, respectively; and
    a receiver configured to receive, while the video image based on the third decoded data and the user interface based on the fourth decoded data are displayed on a first screen of the first electronic apparatus, first operation data regarding a first user operation that is performed on the user interface displayed on the first screen of the first electronic apparatus,
    wherein the one or more hardware processors are further configured to:
        specify a first process, inputted by the first user operation, to control playback of the video image displayed on the first screen of the first electronic apparatus based on both the second decoded data of the user interface stored in the memory and the first operation data; and
        execute the first process.

2. The electronic apparatus of claim 1, wherein the one or more hardware processors are further configured to:
    display the user interface on a second screen of the electronic apparatus by using the second decoded data of the user interface;
    detect a second user operation that is performed on the user interface displayed on the second screen of the electronic apparatus;
    specify a second process, inputted by the second user operation, to control playback of the video image displayed on the first screen of the first electronic apparatus based on the second decoded data of the user interface; and
    execute the second process.

3. The electronic apparatus of claim 1, wherein the one or more hardware processors are further configured to display the user interface on a second screen of the electronic apparatus by using the second decoded data of the user interface, and
    the transmitter is further configured to transmit second operation data regarding a second user operation that is performed on the user interface displayed on the second screen of the electronic apparatus, to the first electronic apparatus, wherein playback of the video image displayed on the first screen of the first electronic apparatus is controlled based on both the second operation data and the fourth decoded data at the first electronic apparatus.

4. The electronic apparatus of claim 1, wherein
    the first operation data comprises coordinate data indicative of coordinates on the first screen of the first electronic apparatus on which the first user operation is performed, and
    the one or more hardware processors are further configured to:
        specify the first process inputted by the first user operation based on both the second decoded data of the user interface and the coordinate data; and
        execute the first process.

5. The electronic apparatus of claim 1, wherein
    the first operation data comprises coordinate data indicative of coordinates on the first screen of the first electronic apparatus on which the first user operation is performed, and time data indicative of a playback position of the video image obtained when the first user operation is performed, and
    the one or more hardware processors are further configured to:

specify the first process inputted by the first user operation preformed on the user interface based on the second decoded data of the user interface, the coordinate data and the time data; and execute the first process.

6. The electronic apparatus of claim 1, wherein the one or more hardware processors are further configured to encode the second decoded data of the user interface to generate re-encoded data, and the transmitter is further configured to transmit the first encoded data and the re-encoded data to the first electronic apparatus, wherein the first encoded data and the re-encoded data are decoded to generate the third decoded data of the video image and fifth decoded data of the user interface at the first electronic apparatus, respectively, and the video image based on the third decoded data and the user interface based on the fifth decoded data are displayed on the first screen of the first electronic apparatus.

7. The electronic apparatus of claim 1, wherein the transmitter is further configured to transmit the first encoded data and the second decoded data of the user interface to the first electronic apparatus, wherein the first encoded data is decoded to generate the third decoded data of the video image at the first electronic apparatus and the video image based on the third decoded data and the user interface based on the second decoded data are displayed on the first screen of the first electronic apparatus.

8. The electronic apparatus of claim 1, wherein the one or more hardware processors are further configured to:

decode the first encoded data to generate first decoded data of the video image; and display the video image and the user interface on a second screen of the electronic apparatus, by using the first decoded data of the video image and the second decoded data of the user interface.

9. The electronic apparatus of claim 1, wherein the one or more hardware processors are further configured to store at least a part of the second decoded data of the user interface and at least a part of the first encoded data associated with at least the part of the decoded data of the user interface.

10. The electronic apparatus of claim 1, wherein the transmitter is configured to transmit the content data comprising the first encoded data and the second encoded data to the first electronic apparatus via connection established between the electronic apparatus and the first electronic apparatus.

11. The electronic apparatus of claim 1, wherein the first encoded data and the second decoded data of the user interface comprise synchronization data to synchronize the first encoded data with the second decoded data of the user interface.

12. The electronic apparatus of claim 1, wherein the transmitter is further configured to transmit third operation data regarding an audio user operation that is performed for the user interface, to the first electronic apparatus, wherein playback of the video image displayed on the first screen of the first electronic apparatus is controlled based on both the third operation data and the fourth decoded data at the first electronic apparatus.

13. A method comprising:

acquiring content data comprising first encoded data of a video image and second encoded data of a user interface;

decoding the second encoded data to generate second decoded data of the user interface without decoding the first encoded data;

storing the second decoded data of the user interface in a memory;

transmitting the content data comprising the first encoded data and the second encoded data, to a first electronic apparatus, wherein the first encoded data and the second encoded data are decoded to generate third decoded data of the video image and fourth decoded data of the user interface at the first electronic apparatus, respectively;

receiving while the video image based on the third decoded data and the user interface based on the fourth decoded data are displayed on a first screen of the first electronic apparatus, operation data regarding a first user operation that is performed on the user interface displayed on the first screen of the first electronic apparatus;

specifying a first process, inputted by the first user operation, to control playback of the video image displayed on the first screen of the first electronic apparatus based on both the second decoded data of the user interface stored in the memory and the operation data; and executing the first process.

14. The electronic apparatus of claim 1, wherein the transmitter is further configured to transmit fourth operation data relating to a cursor indicative of a position of a third user operation performed on the electronic apparatus, to the first electronic apparatus, wherein a cursor is displayed on the first screen of the first electronic apparatus based on the fourth operation data.

* * * * *